(12) United States Patent  (10) Patent No.: US 8,192,016 B2
Siu  (45) Date of Patent: Jun. 5, 2012

(54) SPECTACLES

(76) Inventor: Yu Siu, Hong Kong (HK)

( * ) Notice: Subject to any disclaimer, the term of this patent is extended or adjusted under 35 U.S.C. 154(b) by 0 days.

(21) Appl. No.: 12/583,932

(22) Filed: Aug. 28, 2009

(65) Prior Publication Data

US 2009/0323015 A1    Dec. 31, 2009

Related U.S. Application Data

(63) Continuation-in-part of application No. 11/975,498, filed on Oct. 19, 2007, now Pat. No. 7,658,492.

(60) Provisional application No. 60/901,166, filed on Feb. 15, 2007.

(51) Int. Cl.
*G02C 1/02* (2006.01)
(52) U.S. Cl. .................... 351/110; 351/97; 351/140
(58) Field of Classification Search ............... 351/41, 351/83–86, 90–102, 110, 140, 141, 154
See application file for complete search history.

(56) References Cited

U.S. PATENT DOCUMENTS 5,373,331 A * 12/1994 Vallalla et al. ............... 351/57
7,658,492 B2 * 2/2010 Siu .............................. 351/110
2003/0048405 A1 * 3/2003 Rivera .......................... 351/41

* cited by examiner

*Primary Examiner* — Huy K Mai

(74) *Attorney, Agent, or Firm* — Raymond Y. Chan; David and Raymond Patent Firm

(57) ABSTRACT

A pair of rimless spectacles includes two lenses, a frame including two temple units and a bridge, and a connection mechanism. The connection mechanism includes a plurality of first connectors spacedly provided at the lenses at a predetermined location and a plurality of second connectors provided at a predetermined location of each of the temple units and the bridge respectively, wherein the second connectors are coupled with the first connectors respectively to couple the temple units at two outer sides of the lenses respectively and to couple the bridge between two inner sides of the lenses respectively in a tool-less manner.

18 Claims, 23 Drawing Sheets

SPECTACLES

CROSS REFERENCE OF RELATED APPLICATION

This is a Continuation-In-Part application of a non-provisional application having an application Ser. No. 11/975,498 and a filing date of Oct. 19, 2007 now U.S. Pat. No. 7,658,492, which is a non-provisional application of a provisional application having an application No. 60/901,166 and a filing date of Feb. 15, 2007.

BACKGROUND OF THE PRESENT INVENTION

1. Field of Invention

The present invention relates to spectacles, and more particularly to a rimless spectacles, wherein a plurality of coupling slots are located at the lenses to engage with the temples and the bridge, so as to allow the lenses to be quickly fastened on the temples and the bridge to form an entire body structure of the rimless spectacles.

2. Description of Related Arts

Corrective lens have been existed in human history for a long time. People have used corrective lens to modify the focal length of the eyes and the corrective lens have gradually evolved to wearable glasses. Wearable glasses have been more widely used in modern society. Conventional glasses comprise a lens unit mounted at a frame unit. The frame unit usually comprises a frame, two temples and a bridge. Traditionally, the frame, the temples and the bridge are made integrally to form the frame unit. In other words, the frame, the temples and the bridge are all connected altogether in conventional spectacles, wherein each temple is fastened by a screw to an outer side of the frame.

The main purpose for people to wear spectacles is to correct vision or protect the eyes. Also, since spectacles are usually placed on the faces of people, people have even higher demands on the aesthetic value of the spectacles. As illustrated above, the frame is an indispensable component of the spectacles and the frame is usually adapted to secure the lens unit. Also, the conventional frame of the spectacles is usually made of metal materials or other stiff materials. So, when people wear spectacles, existence of the spectacle frame usually change the person's appearance on the face which is also a shortcoming of conventional spectacles.

With development of the society, more and more varieties extend from the conventional spectacles, such as rimless spectacles. Structurally, the rimless spectacles comprise lenses, temples, and a bridge directly connecting two lenses, wherein more than one connection holes are on each lens, such that the temples and the bridge are connected at the connection holes respectively. Generally speaking, the lens is made by glass materials, especially for near-sighted and farsighted spectacles. Furthermore, the thickness of the lens in the middle is different from that on the side. In other words, the surface of the lens of either near-sighted or farsighted spectacles is not a flat surface, and the difficulty of drilling holes thereon is thus increased. Normally, when drilling the holes on an object, the drilling device has to be perpendicular to the surface to be drilled to achieve the best drilling effect. In addition, the stiffness of glass materials is high and drilling holes thereon is likely to cause the glass material to break.

In addition, the tolerance of the hole must be considered. If the hole is too big, the lens will be unstable after the temples and the bridge are mounted thereto. If the hole is too small, the temples and the bridge cannot be affixed thereto. Or the lens will be cracked when the temples and the bridge are forced to affix to the lens.

With the difficulty in drilling holes on the lens mention above, it is inconvenient for customers to purchase rimless spectacles because when one chooses his or her own rimless spectacles, the lenses and the spectacle frame are separately chosen by the customer and put together by a technician. Because of the difficulty in drilling holes on an uneven lens surface, the technician usually takes longer time to put the lenses and the spectacle frame together. In other words, the customer has to wait for a long time from choosing the spectacles to actually receiving the final product.

Improved rimless spectacles are found in the market that the rimless spectacles do not require any hole predrilled on the lens. The lens has a notch pre-formed at the peripheral edge to fit a core-wire at the notch. Therefore, the temples and the bridge can be mounted to the lenses through the wires. However, such rimless spectacles can be made only in particular styles of lenses and the assembling operation is relatively complicated.

SUMMARY OF THE PRESENT INVENTION

A main object of the present invention is to provide a pair of spectacles, wherein the rimless spectacles are manufactured by a unique method to provide a special connection way to connect the lenses and the spectacle frame.

Another object of the present invention is to provide the spectacles, wherein each of the lenses thereof comprises two first connectors corresponding to second connectors at the temple units and the bridge, such that the lenses can be fastened on the temple units and the bridge via the first and second connectors.

Another object of the present invention is to provide the spectacles, wherein it is not necessary to drill any hole on the lenses, so the difficulty in manufacturing is reduced and the manufacturing efficiency is thus increased.

Another object of the present invention is to provide the spectacles, wherein when a customer purchases the spectacles, he or she can receive the final product quickly due to special manufacturing and connection design of rimless spectacles in the present invention.

In order to accomplish the goal of the present invention, the spectacles comprise:

two lenses, each of which has a front side, a rear side, and a peripheral edge which is defined between laterals of the front and the rear sides;

a frame comprising two temple units and a bridge;

a connection unit comprising a plurality of first connectors provided at the peripheral edges of the lenses respectively and a plurality of second connectors, which are located at the two temple units and the bridge to detachably couple with the first connectors respectively, wherein the two temple units are coupled at two outer sides of the lenses respectively and the bridge is coupled at two inner sides of the lenses respectively, such that the frame is assembled with the lenses by detachably coupling the second connectors with the first connector to form the rimless spectacles.

These and other objectives, features, and advantages of the present invention will become apparent from the following detailed description, the accompanying drawings, and the appended claims.

DETAILED DESCRIPTION OF THE PREFERRED EMBODIMENT

Figure 1:
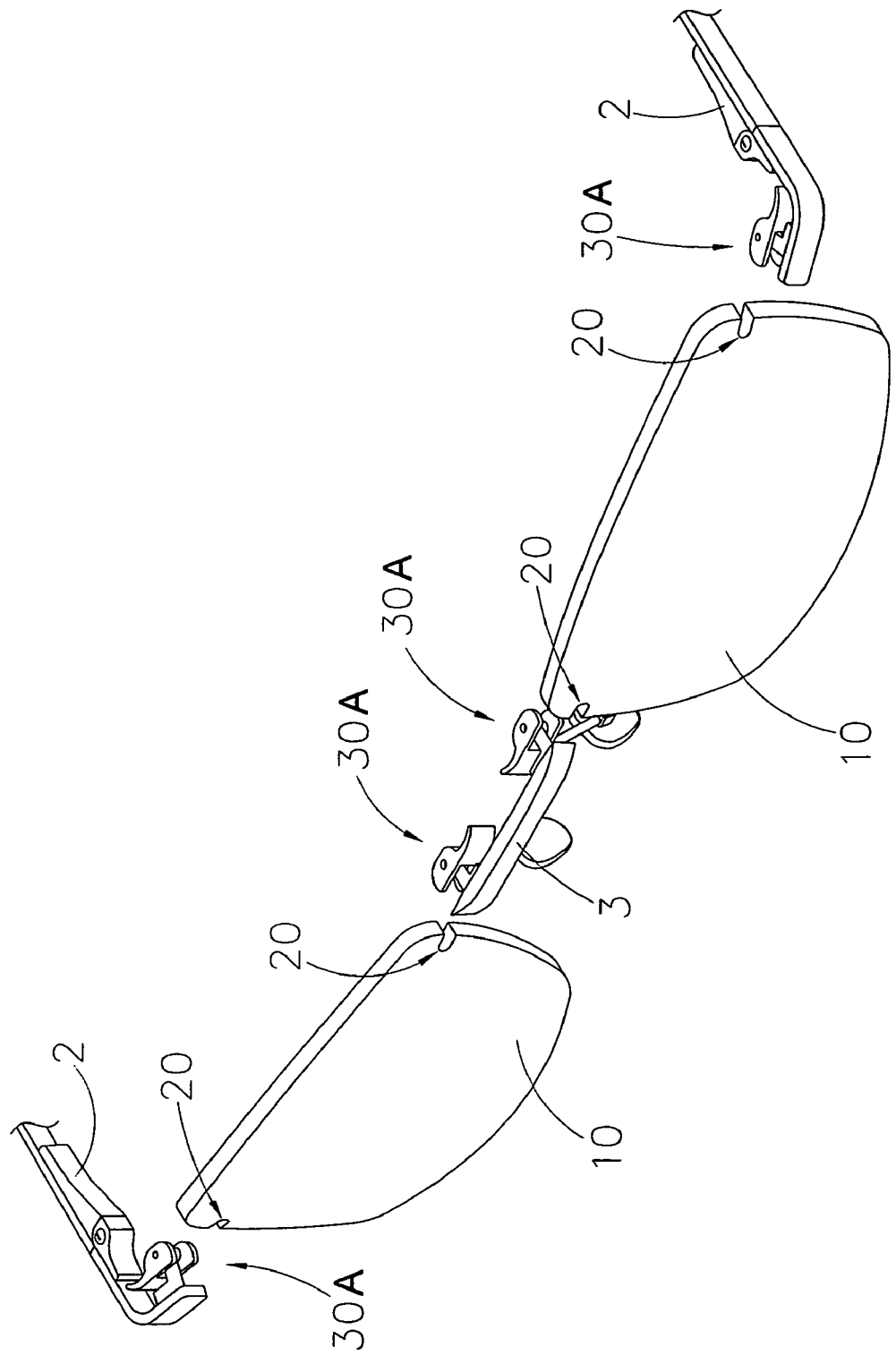
FIG. 1 is an exploded perspective view of the rimless spectacles according to a first embodiment of the present invention.
Figure 2:
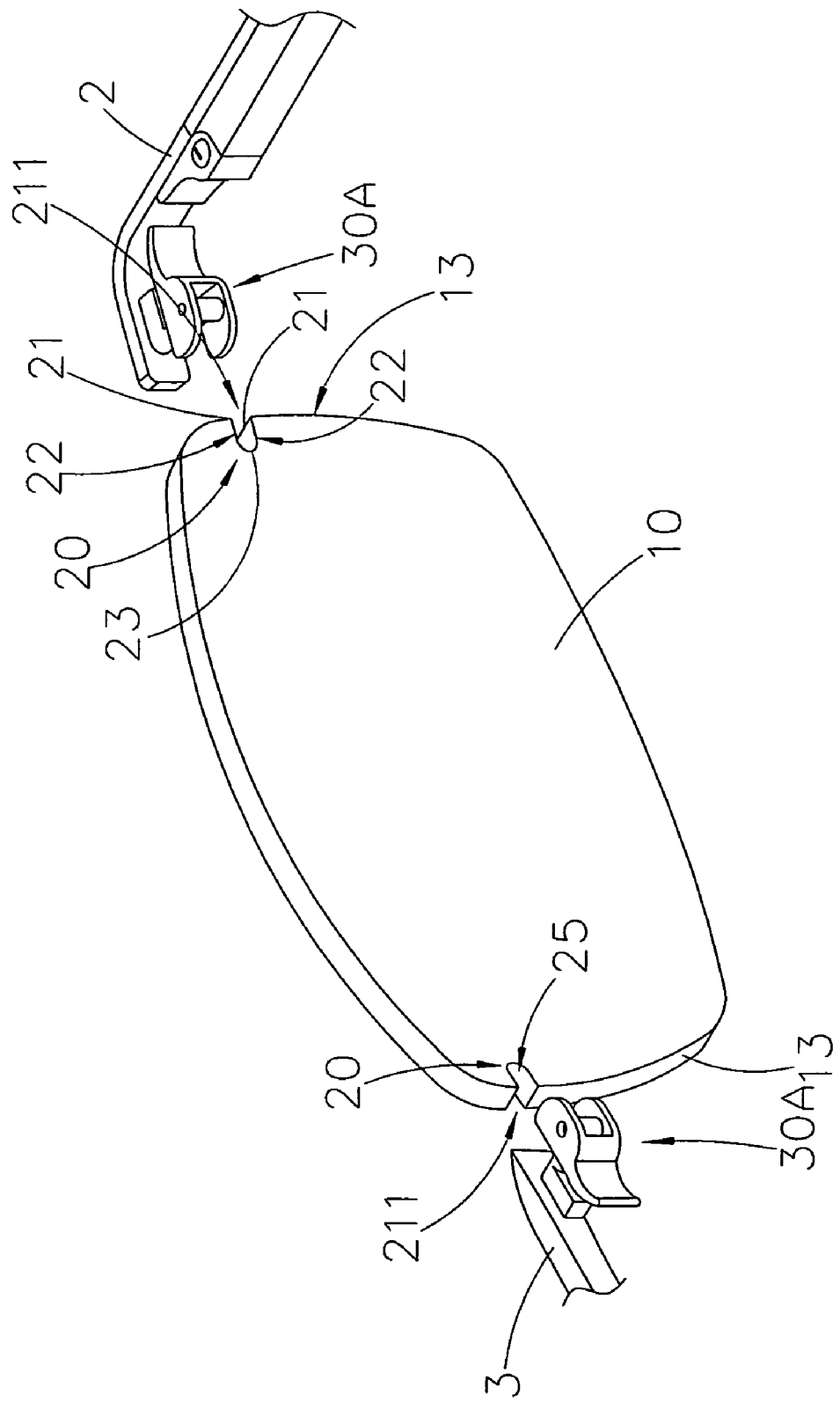
FIG. 2 is an exploded perspective view of the structure of the rimless spectacles according to the first embodiment of the present invention.
Figure 4:
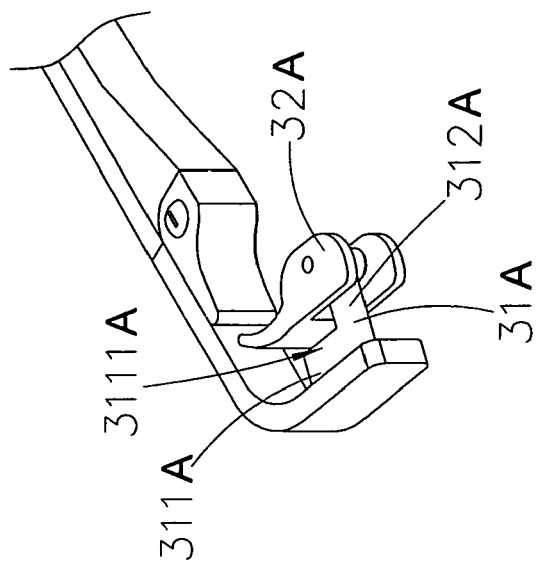
FIG. 4 is a schematic view of the second connector of the rimless spectacles according to the first embodiment of the present invention.

Referring to FIG. 1 to FIG. 4 of the drawings, a rimless spectacles according to preferred embodiment of the present invention is illustrated, wherein the rimless spectacles comprises two lenses 10. Each of the lenses 10 has a front side 11, a back side 12, and a peripheral edge 13 located between the laterals of front and the rear sides 11, 12. A plurality of first connectors 20 of the connection mechanism are spacedly provided at the peripheral edges 13 of the lenses 10 respectively at the inner and outer sides of each of the lenses 10.

The rimless spectacles further comprise a frame which comprises two temple units 2 and a bridge 3. The temple units 2 are arranged to correspondingly couple with two outer sides of the lenses 10 respectively, and the bridge 3 is adapted to couple with two inner sides of the lenses 10 respectively.

The rimless spectacles further comprises a plurality of second connectors 30A of the connection mechanism provided at the temple units 2 and the bridge 3 respectively, wherein the second connectors 30A are detachably engaged with the first connectors 20 at the lenses 10 to couple the temple units 2 and the bridge 3 with the lenses 10 to form the rimless spectacles without any tool.

Figure 3:
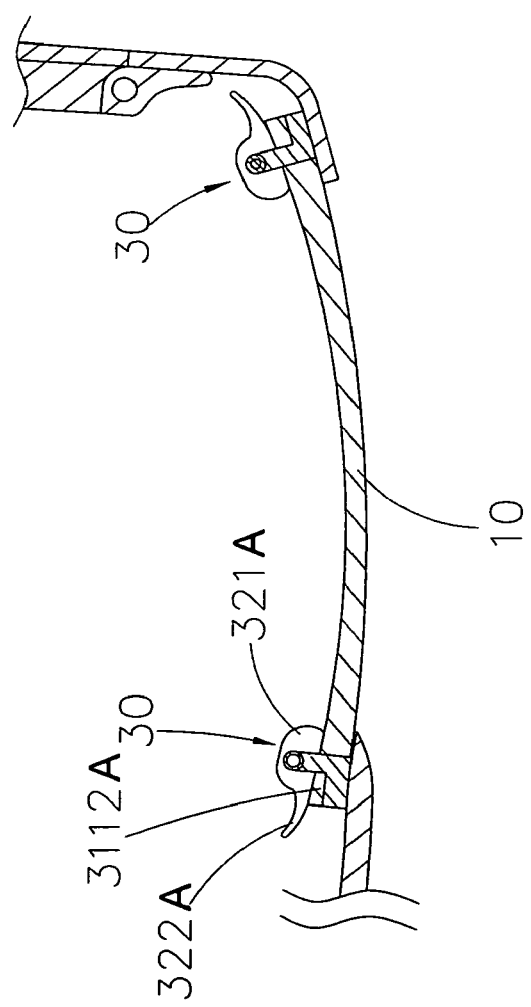
FIG. 3 is a sectional view of the structure of the rimless spectacles according to the first embodiment of the present invention.
Figure 5:
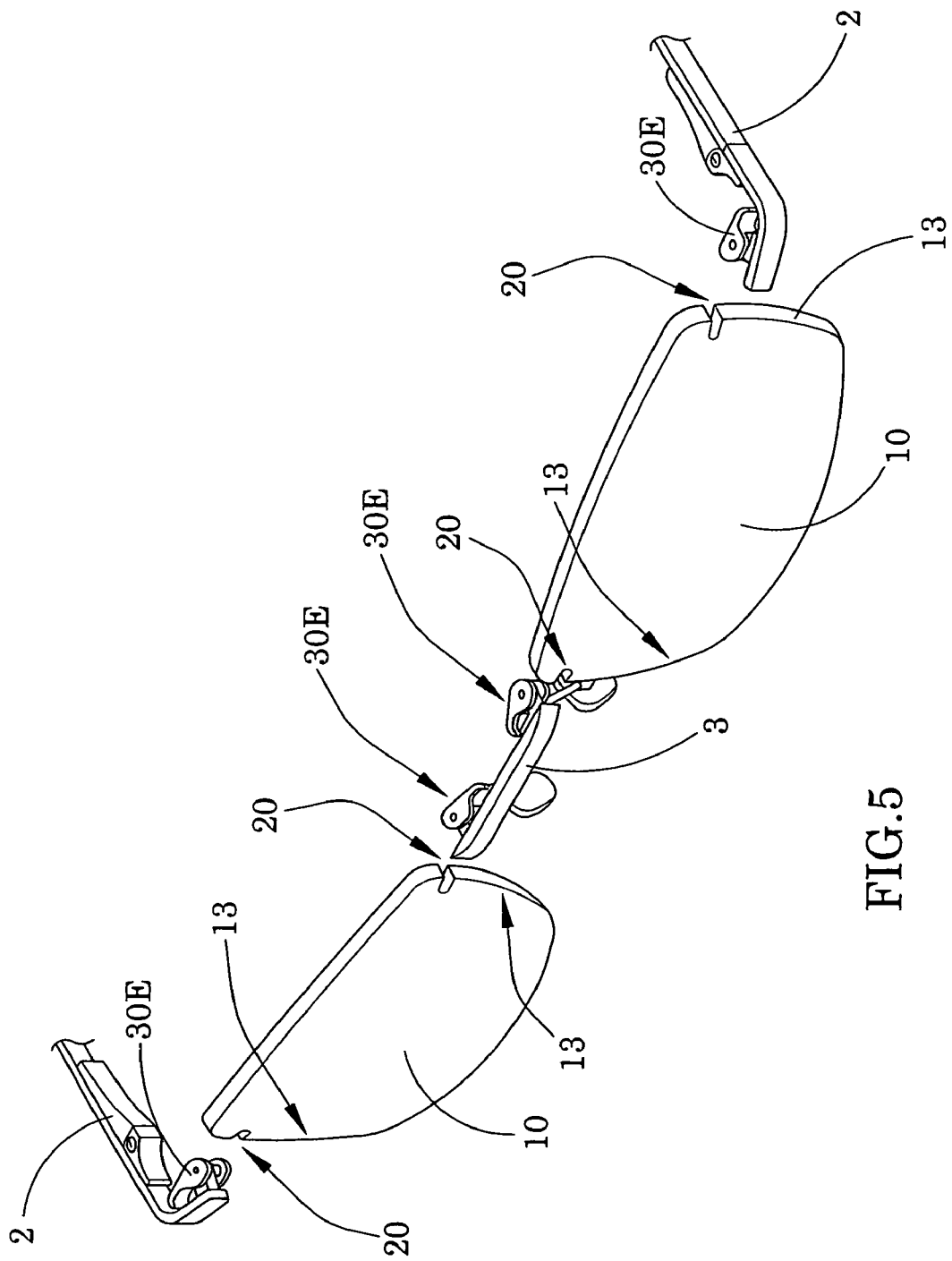
FIG. 5 is an exploded perspective view of the rimless spectacles according to a second embodiment of the present invention.
Figure 6:
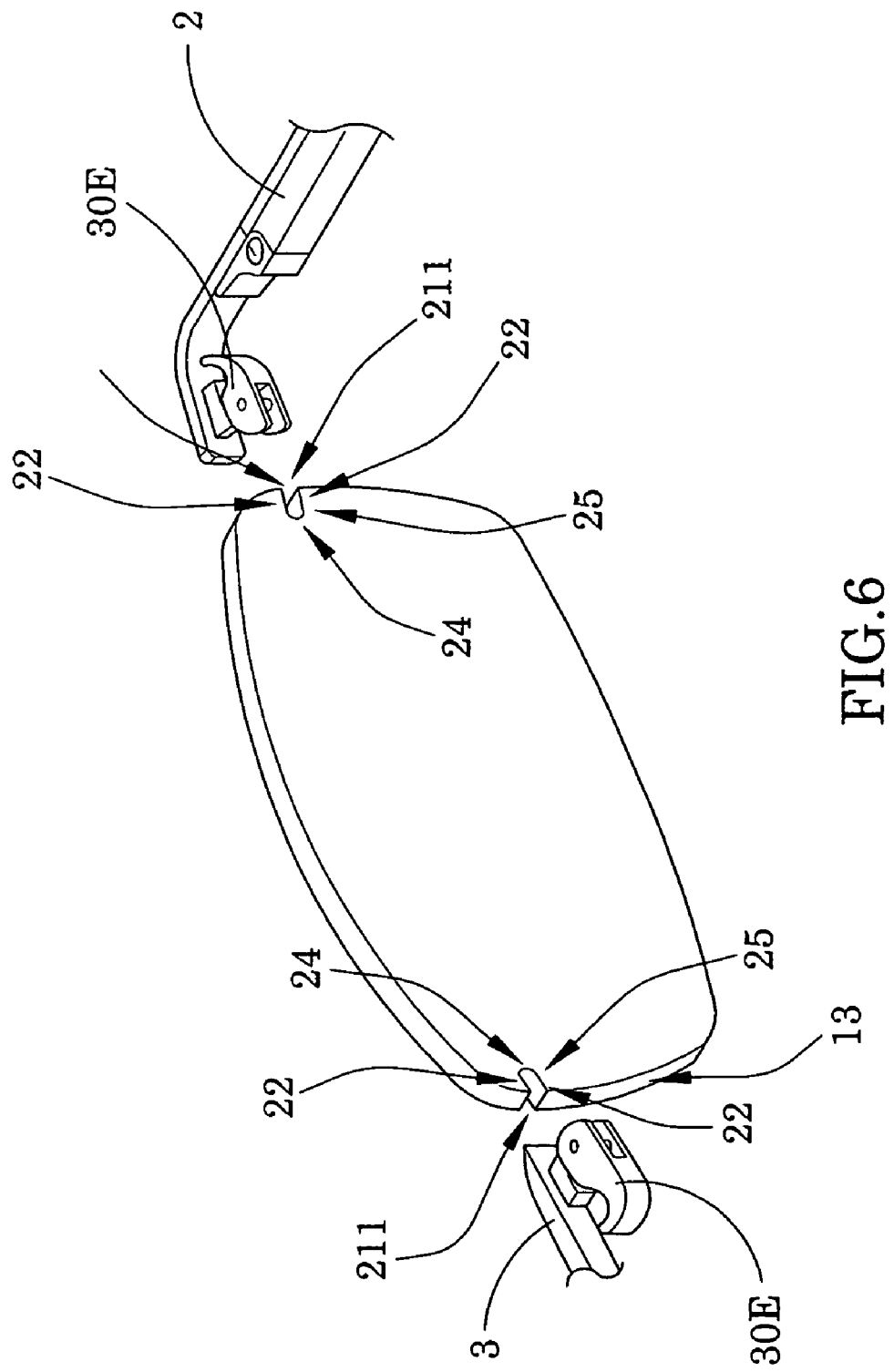
FIG. 6 is an exploded perspective view of the structure of the rimless spectacles according to the second embodiment of the present invention.

As shown in FIG. 3, each of the first connectors 20A is a coupling slot 20 indently formed at the peripheral edge 13 of the respective lens 10 to define two spaced apart opening edges 21 at the peripheral edge 13 and an opening 211 between the opening edges 21.

More specifically, the coupling slot 20 has two side surfaces 22 and an enlarged arc surface 23 extending therefrom to form a coupling groove 25, wherein the two side surfaces 22 are facing toward each other and are inwardly extended from two opening edges 21 respectively. The distance between the two side surfaces 22 is larger than the distance between the two opening edges 21 such that the width of the opening 211 is smaller that the distance between the two side surfaces 22.

The arc surface 23, which is integrally extended from the two side surfaces 22 respectively, defines a curved contacting surface 24, wherein the coupling groove 25, which is the coupling slot 20, is defined within the two side surfaces 22 and the curved contacting surface 24.

Since the coupling slot 20 in the present invention is continuous channel defined by two opening edges 21 which are inwardly extended, such that it is unnecessary to drill any hole on the lenses 10 in the present invention. Technicians can easily cut at the peripheral edge 13 inwardly to form two side surfaces 22 and the arc surface 23 to form the coupling slot 20. The distance between the two side surfaces 22 equals to the width of the opening 211. In other words, the two side surfaces 22 are extended in a parallel manner.

As shown in FIGS. 1 to 4, each of the second connectors 30A comprises a connecting member 31A and a clipping member 32A, wherein the connecting members 31A are provided at the temple units 2 and the bridge 3 respectively. Each of the connecting members 31A comprises a retention inserter 311A and a coupling shaft 312A, wherein the retention inserter 311A has a shape and size corresponding to the shape and size of the respective coupling slot 25. Each of the retention inserters 311A has a retention surface 3111A and a biasing surface 3112A, wherein the retention surface 3111A is shaped and sized corresponding to the curved contacting surface 24. When the retention inserter 311A is slidably inserted into the corresponding coupling slot 20 inwardly from the peripheral edge 13 of the lens 10, the retention surface 3111A of the retention inserter 311A is biased against the curved contacting surface 24 to securely retain the second connector 30A at the predetermined location of the respective lens 10.

Accordingly, the coupling shaft 312A is coupled with the retention inserter 311A. More specifically, the coupling shaft 312A is coupled with the retention inserter 311A to bias against the biasing surface 3112A thereof.

The clipping member 32A is pivotally engaged with connecting member 31A, wherein the clipping member 32A comprises a pressuring clipper 321A and a trigger 322A. The pressuring clipper 321A is pivotally coupled with the coupling shaft 312A of the connecting member 31A while the trigger 322A is extended from the pressuring clipper 321A. When the connecting member 31A of the second connector 30A is slidably inserted into the coupling slot 20 at the peripheral edge 13 of the lens 10, the trigger 322A is actuated to pivotally move the pressuring clipper 321A to bias against the biasing surface 3112A at the rear side 12 of the lens 10 such that temple units 2 and the bridge 3 can be quickly and firmly engaged with the lenses 10 by the clipping force.

As shown in FIGS. 5 to 8, a second embodiment of the rimless spectacles illustrates an alternative mode of the first embodiment. As shown in FIGS. 5 to 8, each of the second connectors 30E comprises a connecting member 31E and a clipping member 32E, wherein the connecting members 31E are provided at the temple units 2 and the bridge 3 respectively. Each of the connecting members 31A comprises a retention inserter 311E and a coupling shaft 312E, wherein the retention inserter 311E has a shape and size corresponding to the shape and size of the respective coupling slot 25. Each of the retention inserters 311E has a retention surface 3111E and a biasing surface 3112E, wherein the retention surface 3111E is shaped and sized corresponding to the curved contacting surface 24. When the retention inserter 311E is slidably inserted into the corresponding coupling slot 20 inwardly from the peripheral edge 13 of the lens 10, the retention surface 3111E of the retention inserter 311E is biased against the curved contacting surface 24 to securely retain the second connector 30E at the predetermined location of the respective lens 10.

Accordingly, the coupling shaft 312E is coupled with the retention inserter 311E. More specifically, the coupling shaft 312E is coupled with the retention inserter 311E to bias against the biasing surface 3112E thereof.

The clipping member 32E is pivotally engaged with connecting member 31E, wherein the clipping member 32E comprises a pressuring clipper 321E and a trigger 322E. The pressuring clipper 321E is pivotally coupled with the coupling shaft 312E of the connecting member 31E while the trigger 322E is extended from the pressuring clipper 321E. When the connecting member 31E of the second connector 30E is slidably inserted into the coupling slot 20 at the peripheral edge 13 of the lens 10, the trigger 322E is actuated to pivotally move the pressuring clipper 321E to bias against the biasing surface 3112E at the rear side 12 of the lens 10 such that temple units 2 and the bridge 3 can be quickly and firmly engaged with the lenses 10 by the clipping force.

Figure 7:
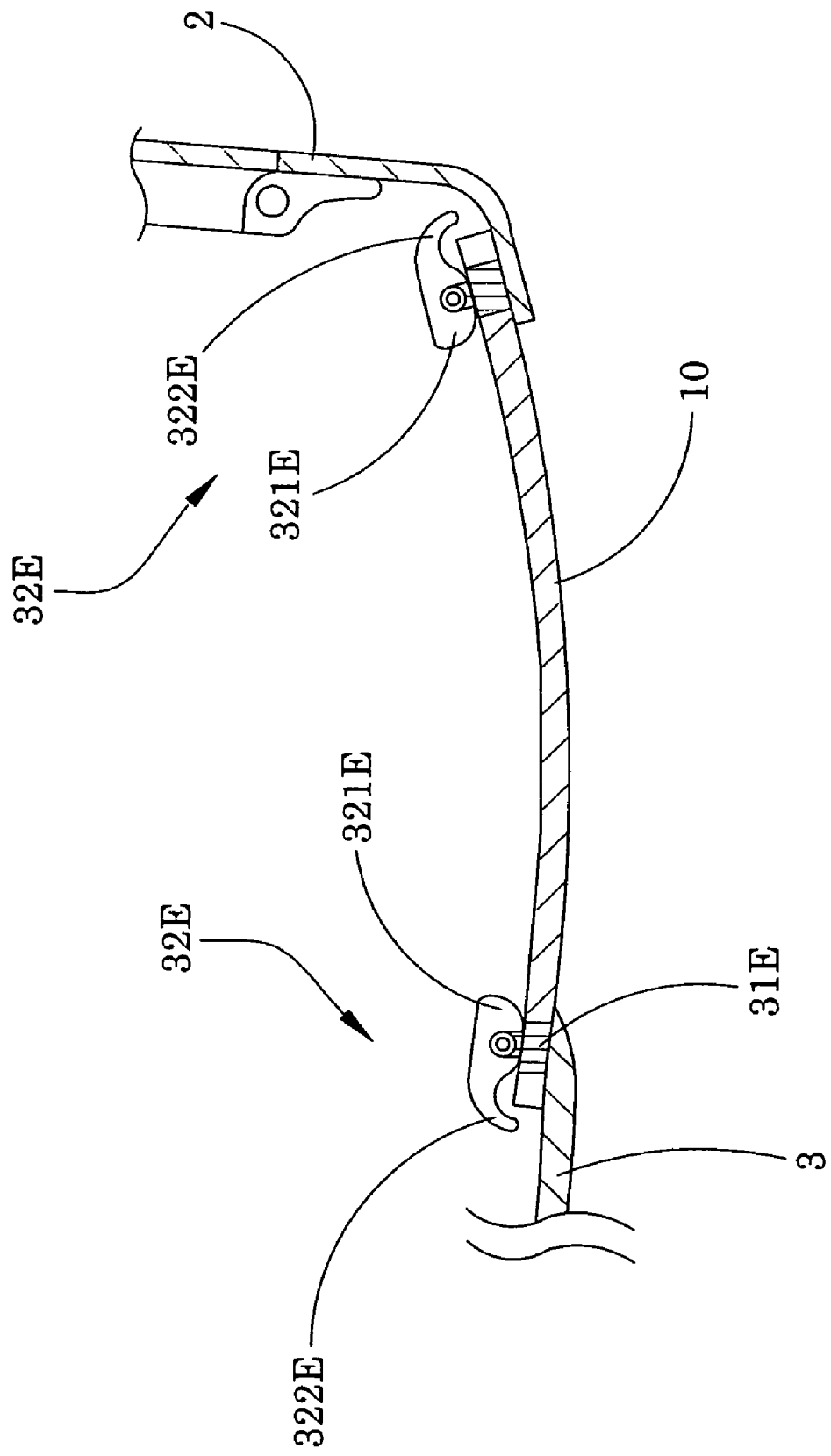
FIG. 7 is a sectional view of the structure of the rimless spectacles according to the second embodiment of the present invention.
Figure 8:
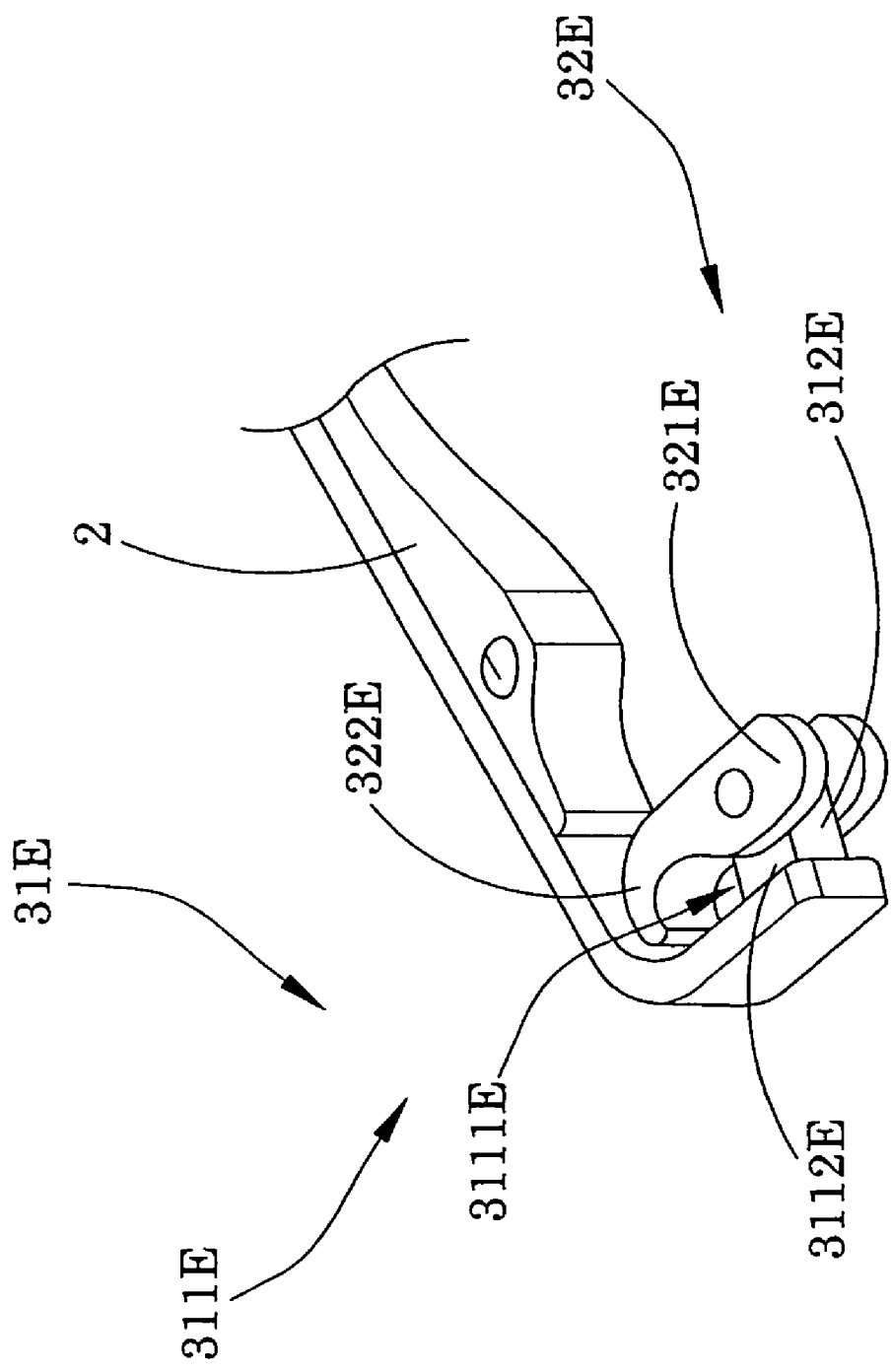
FIG. 8 is a schematic view of the second connector of the rimless spectacles according to the second embodiment of the present invention.

Accordingly, the only difference between the first and second embodiments is that the direction of the trigger 332A, 322E. Comparing FIG. 3 with FIG. 7, the trigger 322A of the second embodiment has a curved shape curving away from the optical lens 10. In other words, the tip of the trigger 322A is pointing away from the optical lens 10. According to the sixth embodiment, the trigger 322E has a curved shape curving towards the optical lens 10 such that the tip of the trigger 322E is located adjacent to the peripheral edge 13 of the lens 10 as shown in FIG. 7.

Therefore, the four second connectors 30E are aligned and located close to the peripheral edges 13 of the lenses 10 at the inner and outer sides thereof respectively so as to enhance the aesthetic appearance of the rimless spectacles and to enhance the actuating operation of each of the second connectors 30E.

Figure 9:
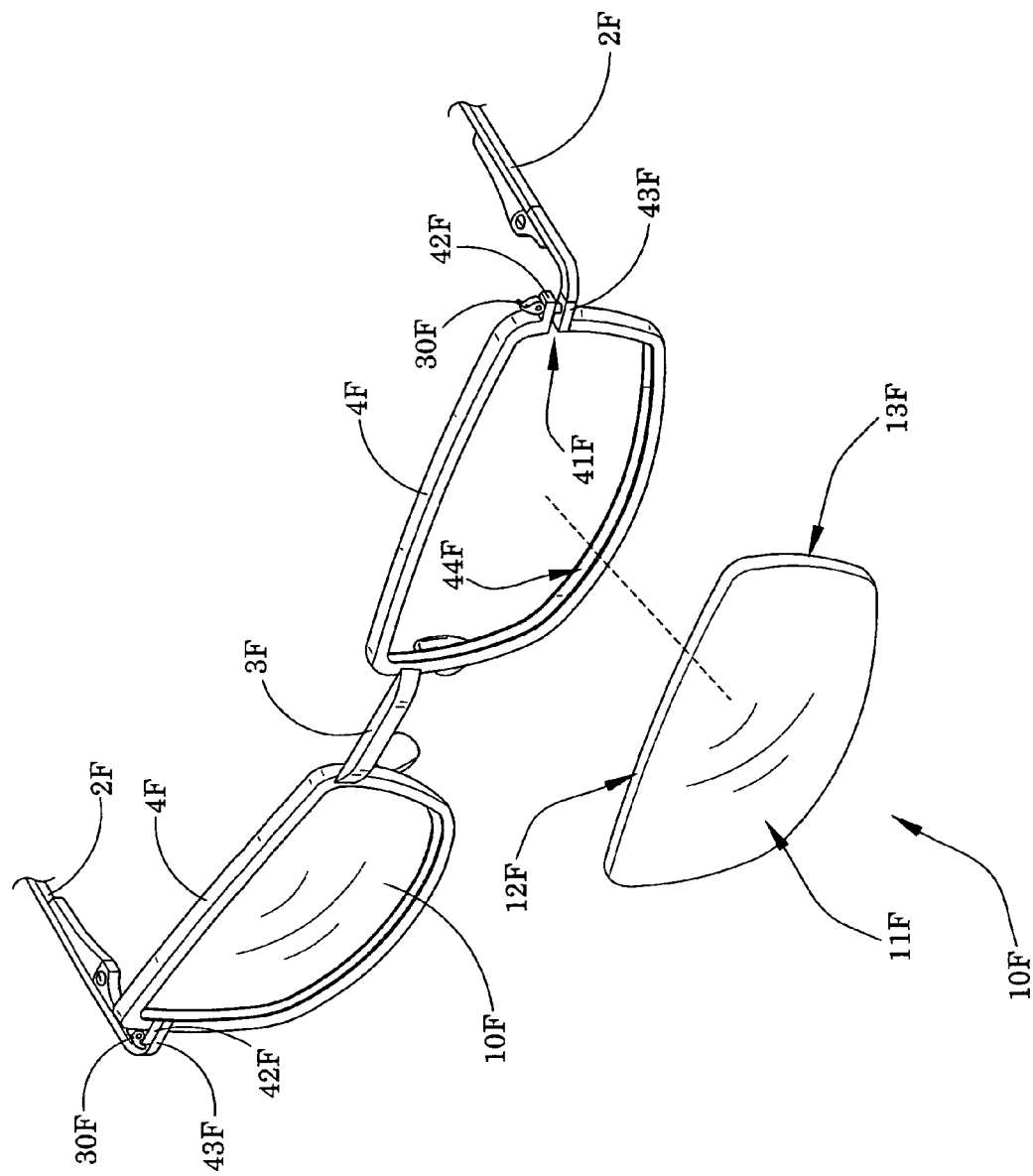
FIG. 9 is a schematic view of the structure of the spectacles according to a third embodiment of the present invention, illustrating the connection mechanism incorporating with the rim-type spectacles.
Figure 10:
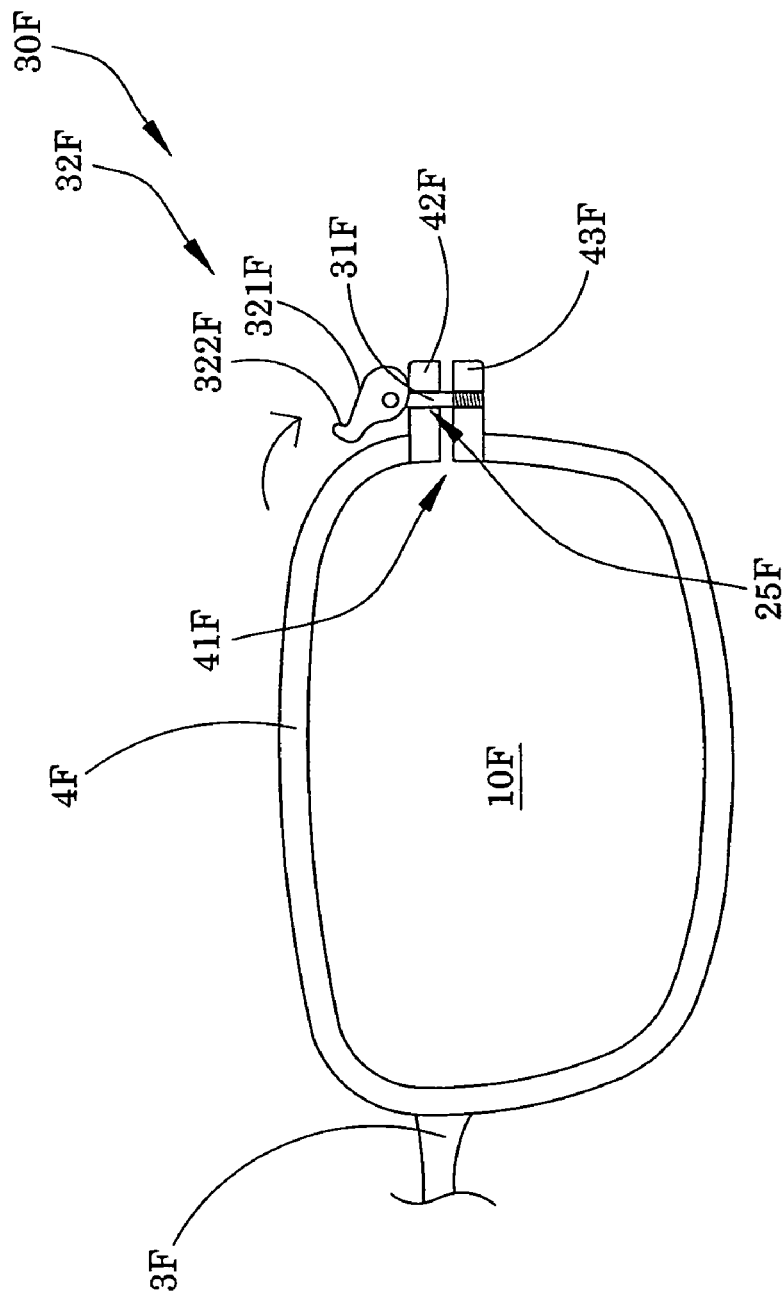
FIG. 10 is a schematic view of the spectacles according to the above third embodiment of the present invention, illustrating the connection mechanism incorporating with the lens rim.
Figure 11:
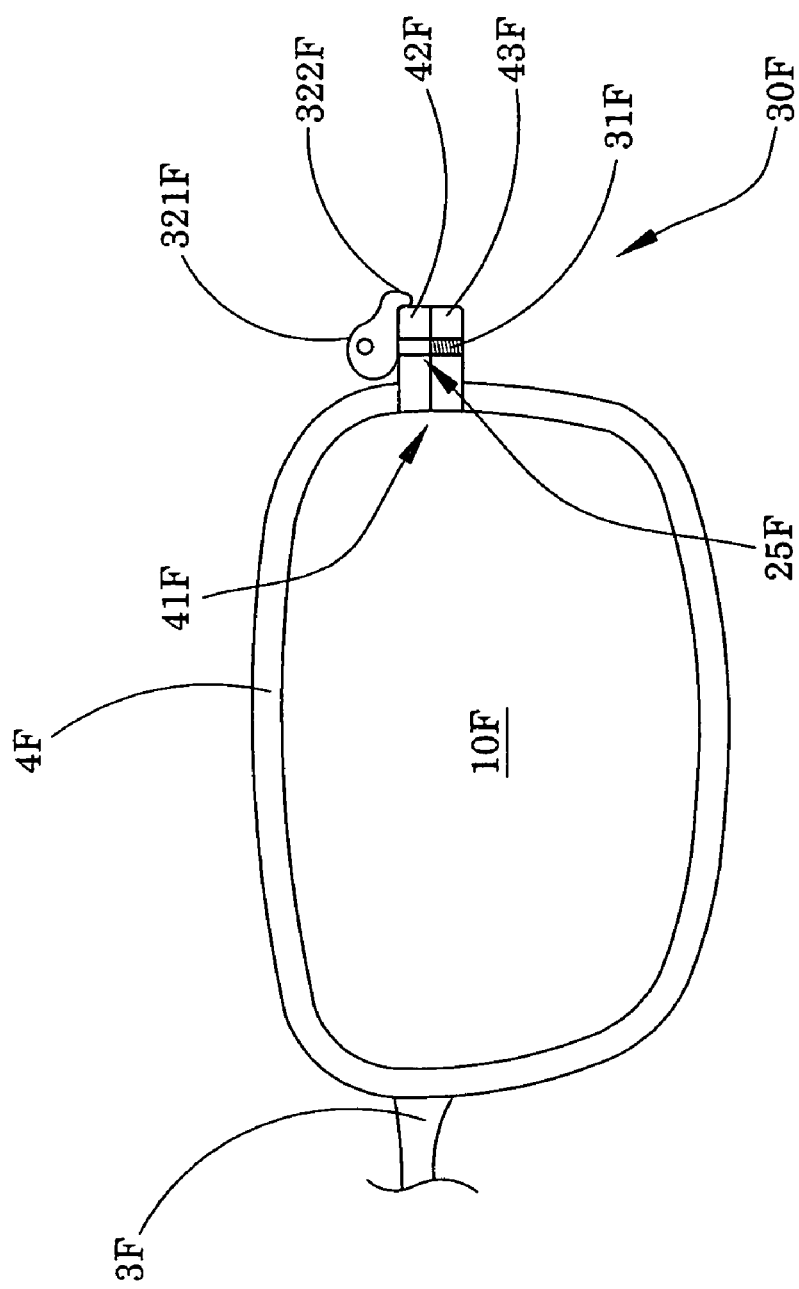
FIG. 11 is a schematic view of the spectacles according to the above third embodiment of the present invention, illustrating the lens being secured at the lens rim via the connection mechanism.

As shown in FIGS. 9 to 11, a third embodiment of the rimless spectacles illustrates an alternative mode of the first embodiment, wherein the spectacles is the rim-type spectacle incorporating with the connection mechanism. As shown in FIG. 9, the spectacles comprise two lenses 10F. Each of the lenses 10F has a front side 11F, a back side 12F, and a peripheral edge 13F located between the laterals of front and the rear sides 11F, 12F.

The first connector comprises two lens rims 4F encirclingly holding around the peripheral edges 13F of the lenses 10F respectively, wherein two temple units 2F are extended from two outer sides of the lens rims 4F respectively, and a bridge 3F is extended between two inner sides of the lens rims 4F respectively.

As shown in FIGS. 9 to 11, each of the lens rims 4F has a side opening 41F provided at the outer side to form a C-shaped structure and upper and lower engaging members 42F, 43F extended from two ends of the lens rim 4F at the side opening 41F, wherein when the upper and lower engaging members 42F, 43F are biased against each other via a second connector 30F to close the side opening 41F, the respective lens 10F is retained within the lens rim 4F. Preferably, each of the temple units 2F is extended from the respective lower engaging member 43F.

Each of the lens rims 4F further has a lens groove 44F indently provided at the inner surface of the lens rim 4F to engage with the peripheral edge 13F of the lens 10F. Therefore, when the side opening 41F is closed, the respective lens 10F is securely retained within the lens rim 4F.

Each of the second connectors 30F comprises a connecting member 31F and a clipping member 32F, wherein each of the connecting members 31F is coupled with the upper and lower engaging members 42F, 43F. The connecting member 31F has one end coupling with the lower engaging member 43F and an opposed end slidably extending through the upper engaging member 42F to pivotally couple with the clipping member 32F. Accordingly, the respective end of the connecting member 31F is a threaded end securely engaging with the lower engaging member 43F, wherein the coupling slot 25F is formed through the upper engaging member 42F for the connecting member 31F slidably passing through the coupling slot 25F.

The clipping member 32F is pivotally engaged with connecting member 31F, wherein the clipping member 32F comprises a pressuring clipper 321F and a trigger 322F. The pressuring clipper 321F is pivotally coupled with the corresponding end of the connecting member 31F while the trigger 322F is extended from the pressuring clipper 321F. When the trigger 322F is actuated to pivotally move the pressuring clipper 321F to bias against the upper engaging member 42F, the upper engaging member 42F is pressed to bias against the lower engaging member 43F so as to close the side opening 41F of the respective lens rim 4F. Therefore, the lens 10F can be quickly and firmly retained within the respective lens rim 4F by the clipping force.

Figure 12A:
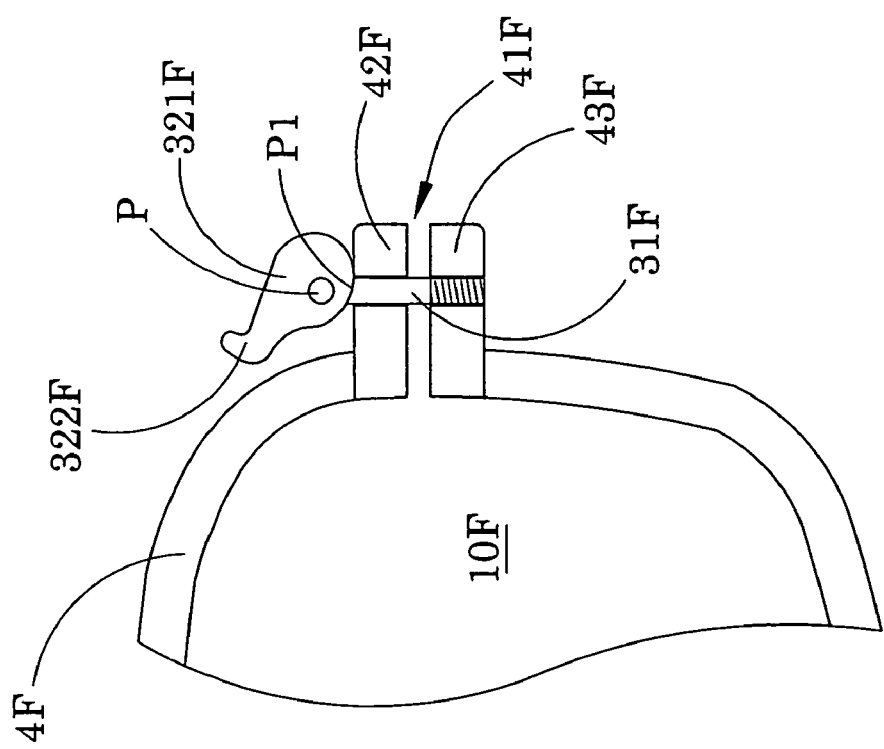
FIG. 12A illustrates the clipping member of the spectacles at the releasing position according to the above third embodiment of the present invention.
Figure 12B:
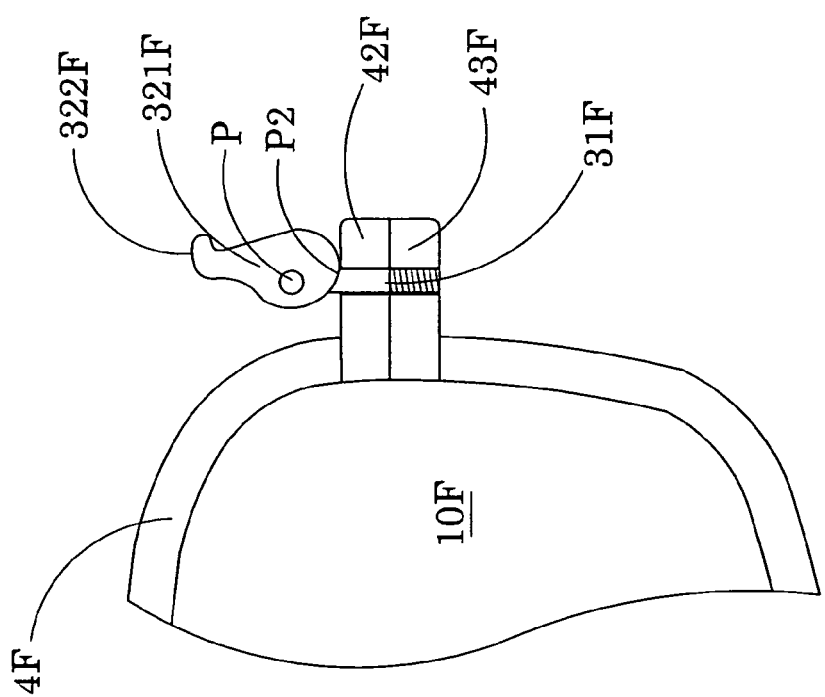
FIG. 12B illustrates the clipping member of the spectacles at the locked position according to the above third embodiment of the present invention.
Figure 12C:
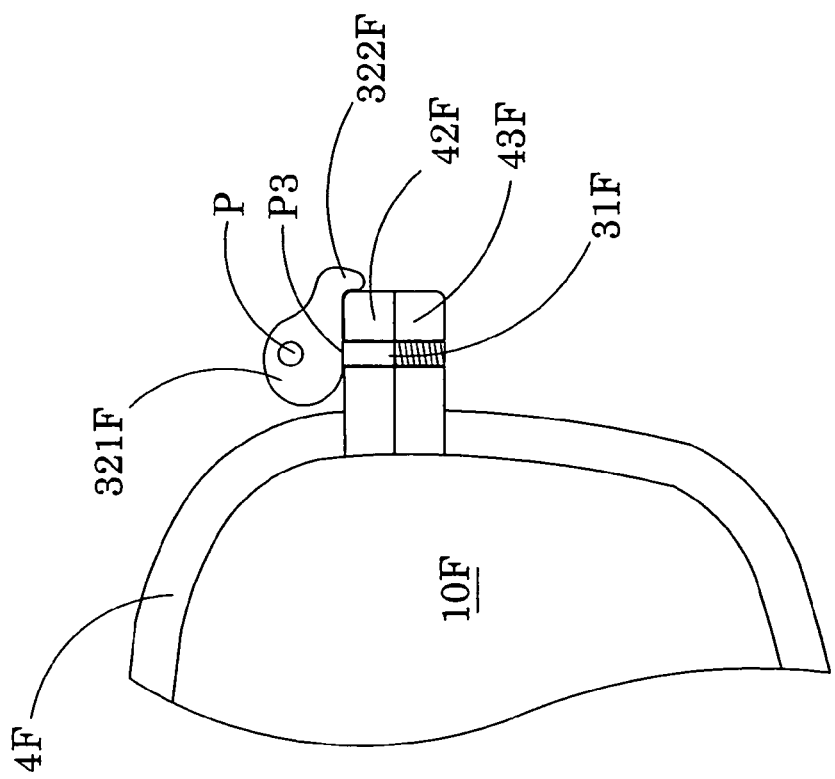
FIG. 12C illustrates the clipping member of the spectacles at the anti-returning position according to the above third embodiment of the present invention.

As shown in FIGS. 12A to 12C, the clipping member 32F is pivotally moved among a releasing position, a locked position, and an anti-returning position. Accordingly, at the releasing position, the clipping member 32F is pivotally moved to enable the upper and lower engaging members 42F, 43F being separated apart to open up the side opening 41F, as shown in FIG. 12A, such that the respective lens 10F is freely removed from or placed within the lens rim 4F. At the locked position, the clipping member 32F is pivotally moved to close the side opening 41F that the upper and lower engaging members 42F, 43F are biased against each other so as to lock up the respective lens 10F within the lens rim 4F, as shown in FIG. 12B. At the anti-returning position, the clipping member 32F is further pivotally moved to ensure the side opening 41F being closed so as to securely retain the respective lens 10F within the lens rim 4F and to prevent the clipping member 32F from being pivotally moved back to the releasing position, as shown in FIG. 12C. It is worth to mention that in order to pivotally move the clipping member 32F between the releasing position and the anti-returning position, the clipping member 32F must be pivotally moved at the locked position. In other words, once the clipping member 32F is pivotally moved at the anti-returning position, the clipping member 32F must be intentionally folded by an external force to the locked position before the clipping member 32F is moved to the releasing position. Preferably, the clipping member 32F is made of elastic material to enable the clipping member 32F being moved among the releasing position, the locked position, and the anti-returning position.

Accordingly, the pressuring clipper 321F of the clipping member 32F has a sliding surface to slide at the upper engaging member 42F among the releasing position, the locked position, and the anti-returning position. The pressuring clipper 321F further defines a first surface point P1 when the pressuring clipper 321F is pivotally moved at the releasing position, a second surface point P2 when the pressuring clipper 321F is pivotally moved at the locked position, and a third surface point P3 when the pressuring clipper 321F is pivotally moved at the anti-returning position. As it is mentioned above, the pressuring clipper 321F is pivotally coupled with the connecting member 31F at the pivot point P thereof. A first distance between the pivot point P and the first surface point P1 is smaller than a second distance between the pivot point P and the second surface point P2 which is smaller than a third distance between the pivot point P and the third surface point P3.

The first distance is defined that the upper engaging member 42F is adapted to move apart from the lower engaging member 43F to open up the side opening 41F. The second distance is defined that the upper engaging member 42F is biased against the lower engaging member 43F to hold the lens 10F within the lens rim 4F in position. The third distance is defined the upper engaging member 42F is biased against the lower engaging member 43F to securely retain the lens 10F within the lens rim 4F. Since the third distance is larger than the second distance, the clipping force at the anti-returning position is greater than the clipping force at the locked position.

In order to achieve the above mentioned feature, the pressuring clipper 321F of the clipping member 32F can be configured that the pivot point P is eccentric to a center of the pressuring clipper 321F.

Accordingly, the sliding surface of the pressuring clipper 321F of the clipping member 32F is slid among the releasing position, the locked position, and the anti-returning position. The sliding surface of the clipping member 32F has a curved surface portion to slide between the releasing position and the locked position. The sliding surface of the clipping member 32F further has a flat surface portion extended from the curved surface portion arranged when the pressuring clipper 321F is moved at the anti-returning position, the flat surface portion of the pressuring clipper 321F is biased against the upper engaging member 42F for further preventing the pressuring clipper 321F being slid back to the locked position.

It is worth to mention that the clipping member 32F of the second connectors 30F, with the three different positions, can be used in the second connectors 30E for the clipping member 32E coupling with the coupling slot 20 at the peripheral edge 13 of the lens 10. In other words, the clipping member 32E can be securely engaged with the rimless spectacle as well. Therefore, the clipping member 32E is pivotally coupled with the connecting member 31E to pivotally move among a releasing position, a locked position that the lens 10 is locked up with the frame, and an anti-returning position that the lens 10 is securely retained at the frame for preventing the clipping member 32E from being returned back to the releasing position. In addition, when the clipping member 32E is moved at the anti-returning position, the flat surface portion of the clipping member 32E is biased against the lens 10.

In addition, the second connector 30F can further comprises a spring coaxially mounted at the connecting member 31F for applying an urging force against the clipping member 32F such that when the clipping member 32F is moved at the locked position, the spring will be stretched for applying a spring force against the clipping member 32F to push the upper engaging member 42F biasing against the lower engaging member 43F. When the clipping member 32F is moved at the anti-returning position, the spring will further be stretched for applying a greater spring force against the clipping member 32F to retain the upper engaging member 42F biasing against the lower engaging member 43F. In other words, the spring will apply a greater spring force at the anti-releasing position than that at the locked position.

Figure 13:
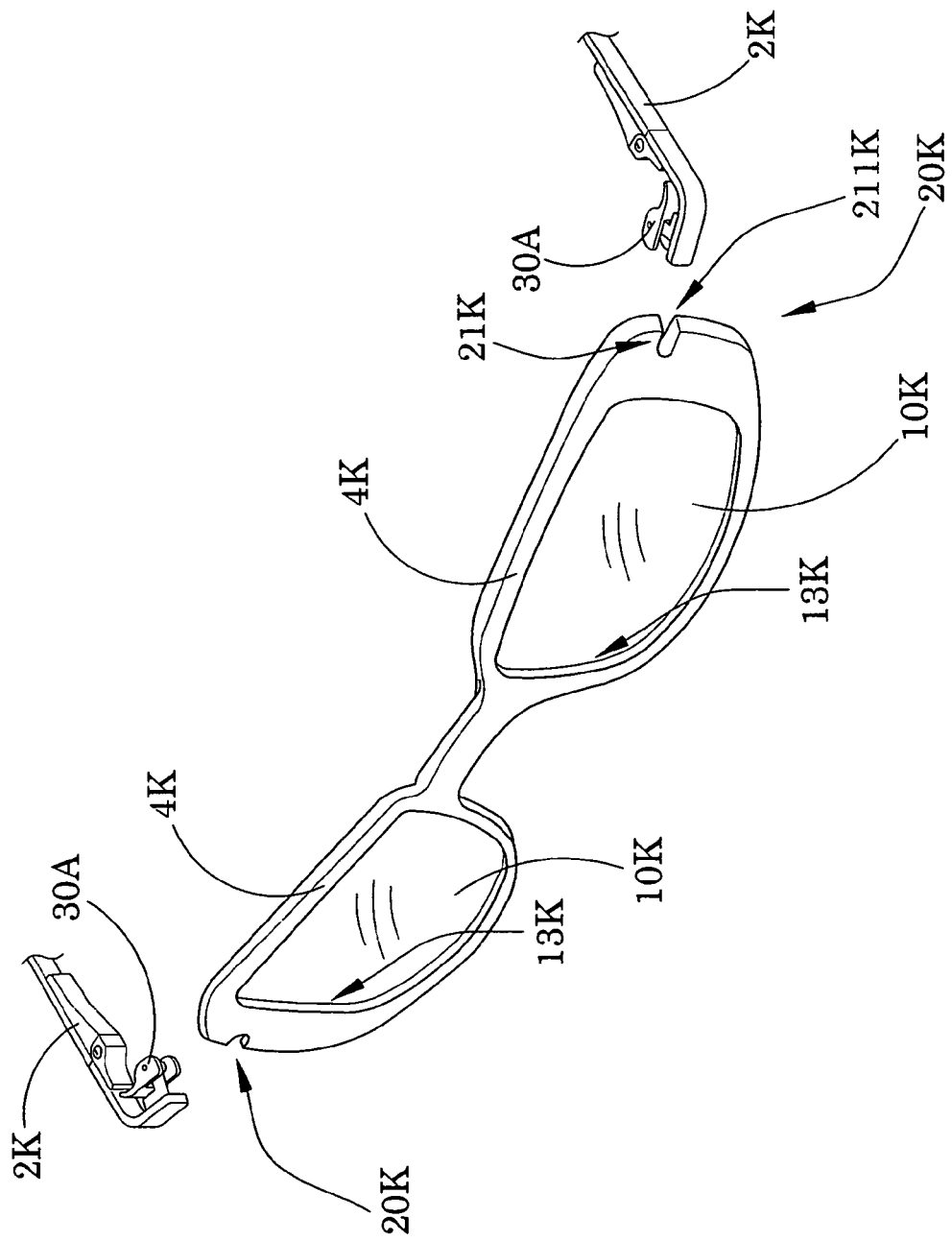
FIG. 13 illustrates of the spectacles according to a fourth embodiment of the present invention, illustrating the alternative mode of second connector incorporating with the rim type spectacles.

As shown in FIG. 13, a fourth embodiment of the rimless spectacles illustrates an alternative mode of the third embodiment, wherein the spectacles is a rim type spectacle. Accordingly, the first connector comprises two lens rims 4K encirclingly holding around the peripheral edges 13K of the lenses 10K respectively, wherein two temple units 2K are extended from two outer sides of the lens rims 4K respectively, and a bridge 3K is extended between two inner sides of the lens rims 4K respectively. The first connector further comprises two coupling slots 20K indently formed at two outer side of the lens rims 4K to define two spaced apart opening edges 21K and an opening 211K between the opening edges 21K. It is appreciated that the configuration of the coupling slot 20K of the eighth embodiment is the same as the configuration of the coupling slot 20K of the second embodiment. The different thereof is that the coupling slot 20K of the second embodiment is indently formed at the peripheral edge 13K of the lens 10K while the coupling slot 20K of the eighth embodiment is indently formed at the peripheral edge of the lens rim 4K.

As shown in FIG. 13, the second connectors 30A are provided at the temple unit 2K to detachably couple with the coupling slots 20K respectively so as to detachably couple the temple units 2K with the lens rims 4K. It is worth mentioning that the detachably coupling structure between the second connector 30A and the coupling slot 20K of the eighth embodiment is the same as the structure between the second connector 30A and the coupling slot 20K of the second embodiment as shown in FIG. 7.

Figure 14:
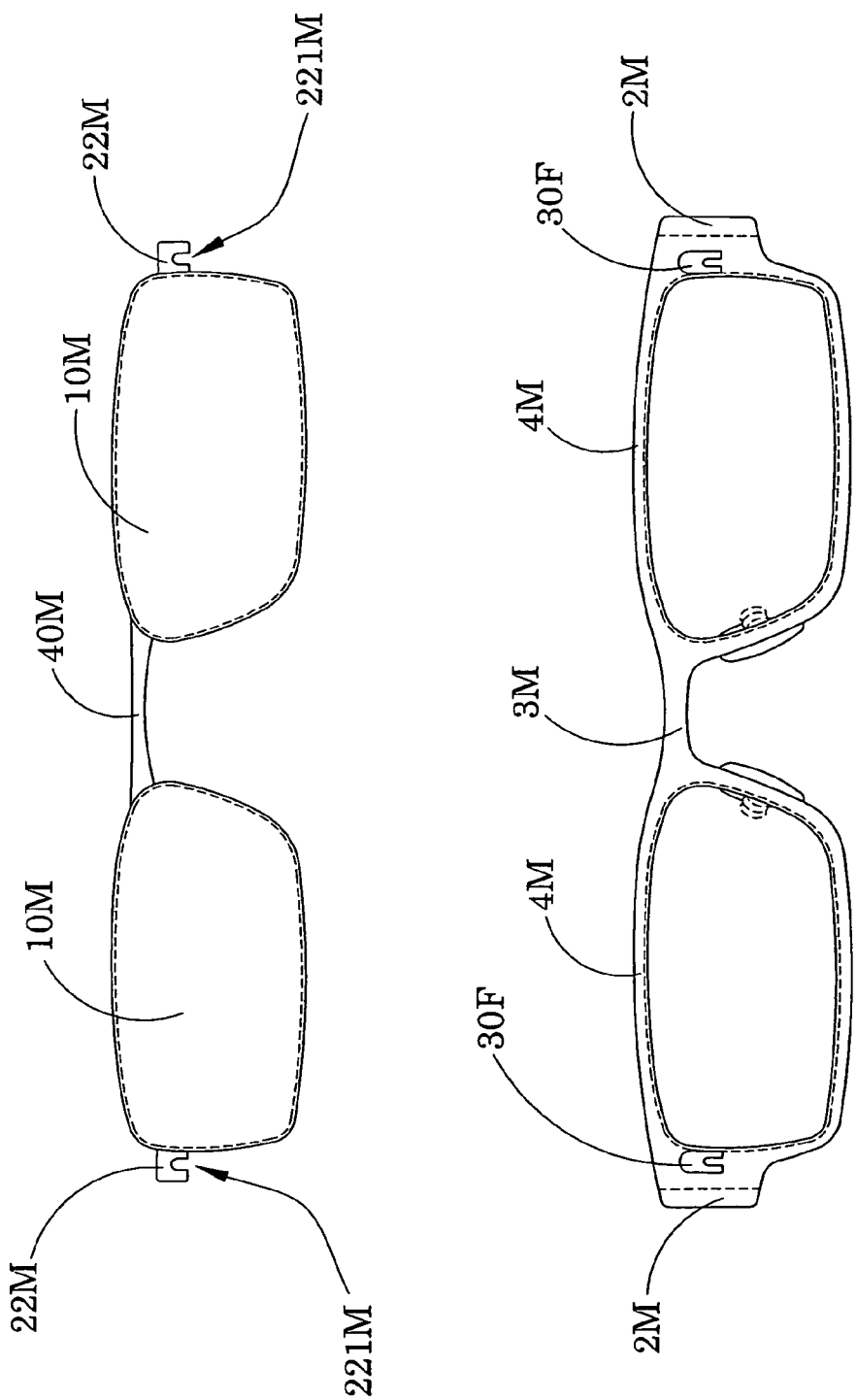
FIG. 14 is a front view of the spectacles according to a fifth embodiment of the present invention.
Figure 15:
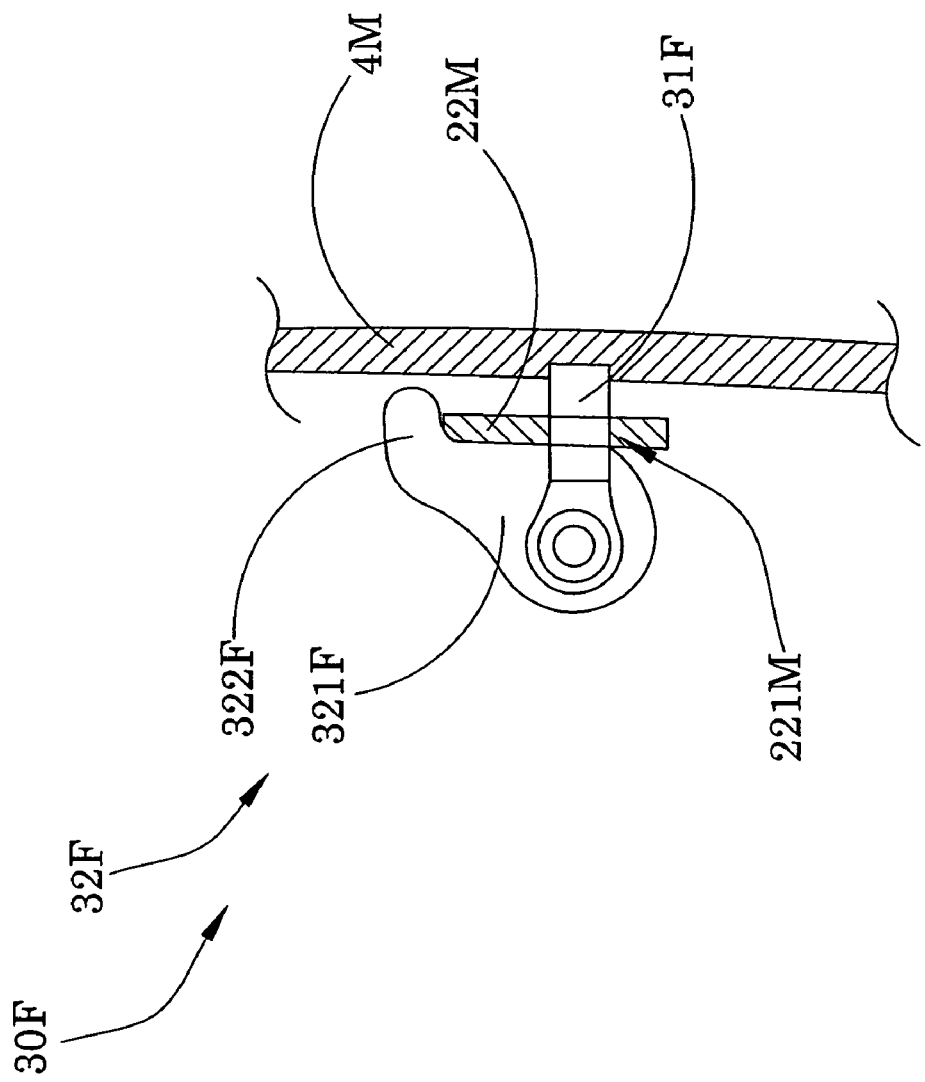
FIG. 15 is a sectional view of the second connector of the spectacle according to the above fifth embodiment of the present invention.

As shown in FIGS. 14 and 15, a spectacle according to a fifth embodiment illustrates another alternative mode of the first embodiment of the present invention, wherein the second connectors 30F are located at different locations. As shown in FIG. 14, the spectacle further comprises a lens frame 40M coupling with the two lenses 10M to retain the distance between the lenses 10M. As it is mentioned above the frame comprises two lens rims 4M, a bridge 3M extended between two inner sides of the lens rims 4M, and two temple units 2M extended from two outer sides of the lens rims 4M respectively. It is worth to mention that the shape of the lens frame 40M matches with the shape of the frame such that when the lens frame 40M is mounted to the frame, the lenses 10M will automatically aligned with the lens rims 4M respectively. The size of the lens frame 40M is smaller than the size of the frame such that when the lens frame 40M is mounted behind the frame, i.e. the rear side of the frame, the lens frame 40M is hidden behind the frame.

The first connector 20M comprises two lens connectors 22M sidewardly extended from two outer sides of the lens frame 40M. As shown in FIG. 14, each of the lens connectors 22M has a hook shape that an engaging slot 221M is indently and upwardly extended from the bottom edge of each of the lens connectors 22M. In other words, each of the lens connectors 22M has an inverted U-shaped configuration.

The second connectors 30F are provided at two outer sides of the frame respectively. As shown in FIG. 14, the second connectors 30F are provided at two outer sides of the lens rims 4M at the rear side thereof to detachably couple with the lens connectors 22M respectively so as to retain the lens frame 40M behind the frame.

Each of the second connectors 30F comprises a connecting member 31F and a clipping member 32F, wherein each of the connecting members 31F is coupled with the respective lens rim 4M. The connecting member 31F has one end coupling with the rear side of the respective lens rim 4M and an opposed end pivotally coupling with the clipping member 32F. As shown in FIG. 15, the lens connector 22M is slidably engaged with the respective second connector 30F at a position that the connecting member 31F is slidably engaged with the engaging slot 221M such that the lens connector 22M is positioned between the rear side of the lens rim 4M and the clipping member 32F.

As it is mentioned above, the clipping member 32F is pivotally engaged with connecting member 31F, wherein the clipping member 32F comprises a pressuring clipper 321F and a trigger 322F. The pressuring clipper 321F is pivotally coupled with the corresponding end of the connecting member 31F while the trigger 322F is extended from the pressuring clipper 321F. When the trigger 322F is actuated to pivotally move the pressuring clipper 321F to bias against the rear side of the lens connector 22M, the lens connector 22M is securely clipped between the clipping member 32F and the lens rim 4M. Therefore, the lens frame 40M can be quickly and firmly mounted behind the frame by the clipping force.

It is appreciated that the clipping member 32F is pivotally moved among a releasing position, a locked position, and an anti-returning position. Accordingly, at the releasing position, the clipping member 32F is pivotally moved to prolong the distance between the rear side of the lens rim 4M and the clipping member 32F so as to enable the lens connector 22M being freely slid to engage with the connecting member 31F. At the locked position, the clipping member 32F is pivotally moved to bias against the rear side of the lens connector 22M so as to lock up the respective lens frame 40M at the rear side of the lens rim 4M. At the anti-returning position, the clipping member 32F is further pivotally moved to ensure the lens connector 22M being biased by the clipping member 32F so as to securely retain the lens frame 40M at the rear side of the lens rim 4M and to prevent the clipping member 32F from being pivotally moved back to the releasing position.

Figure 16:
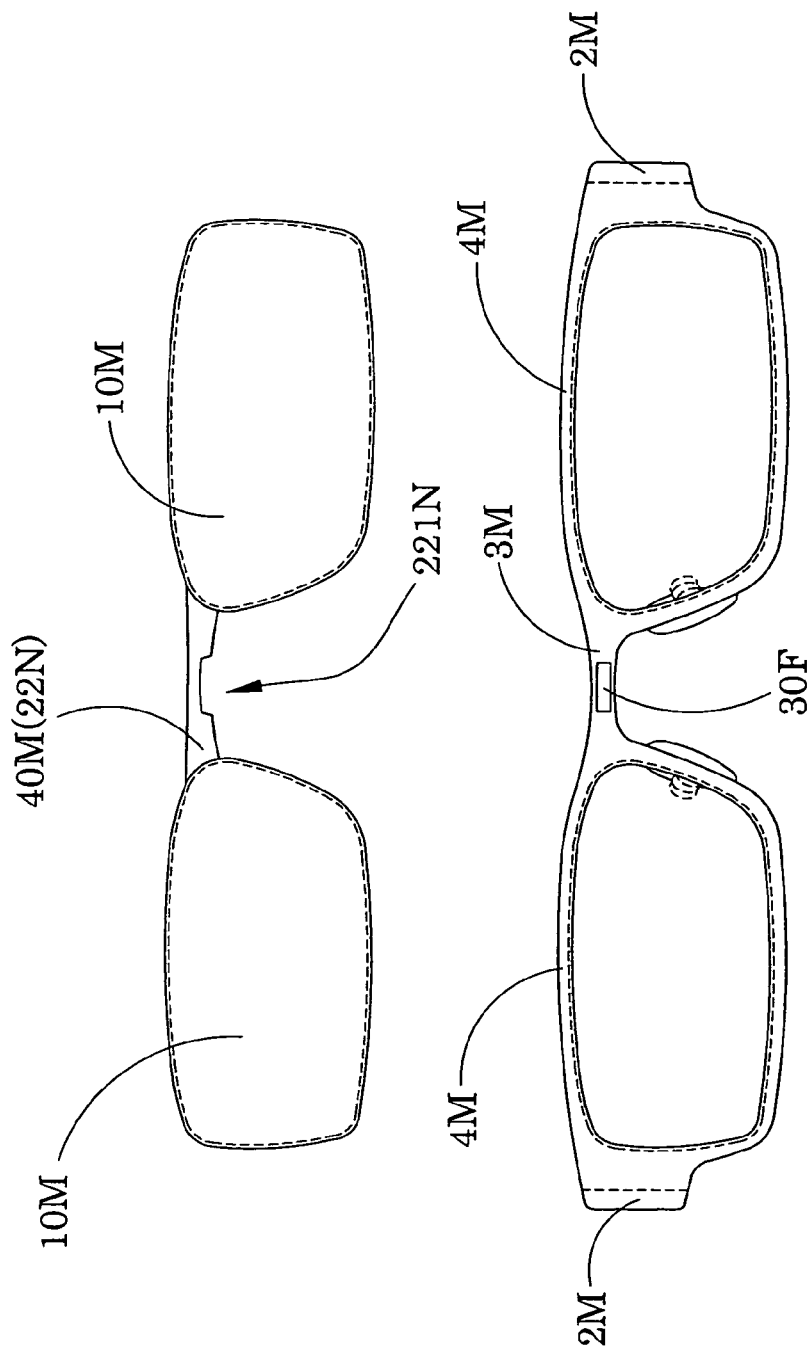
FIG. 16 is a front view of the spectacles according to a sixth embodiment of the present invention.
Figure 17:
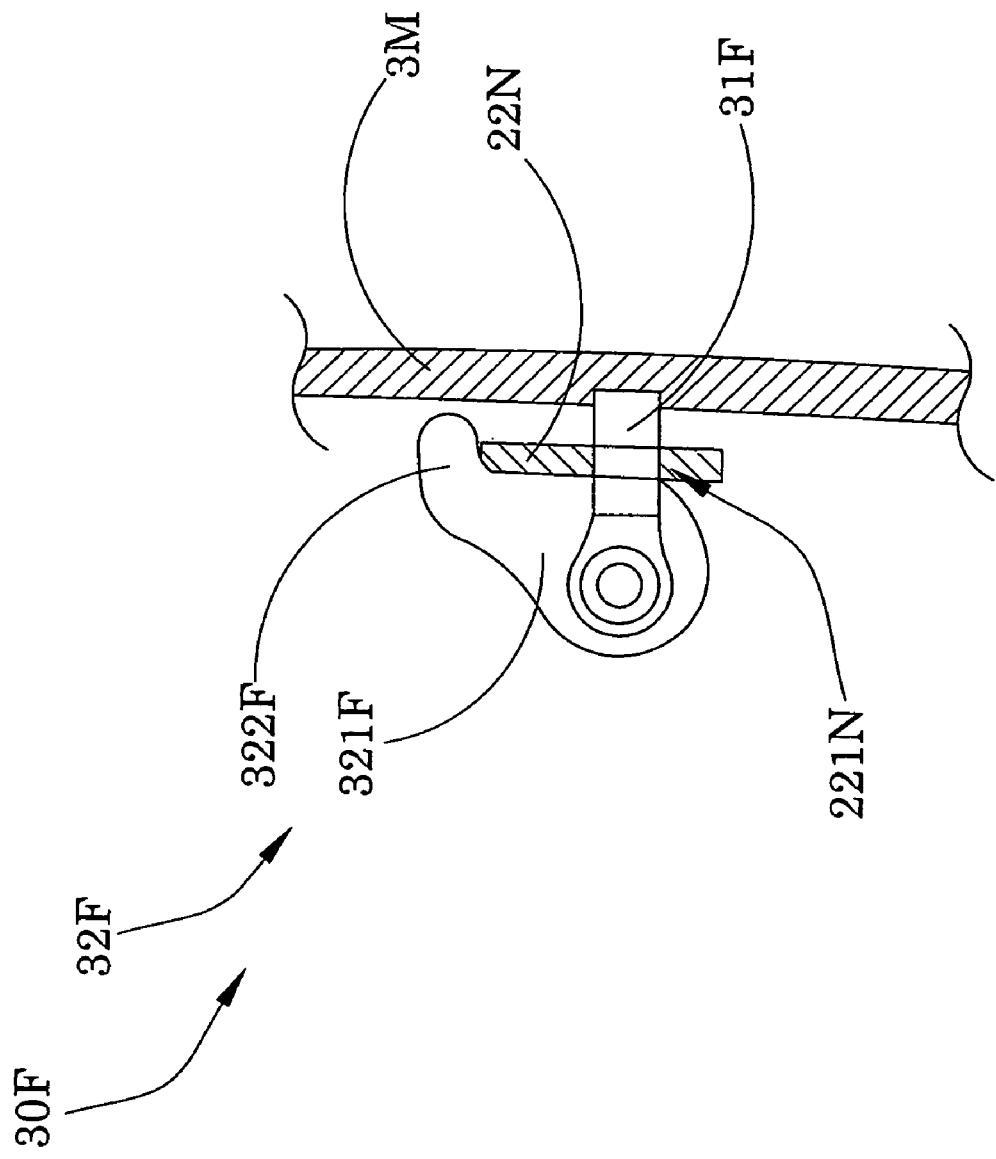
FIG. 17 is a sectional view of the spectacles according to the above sixth embodiment of the present invention.

As shown in FIGS. 16 and 17, a spectacle of a sixth embodiment illustrates an alternative mode of the fifth embodiment, wherein the second connector 30F is located at different location.

As shown in FIG. 16, the first connector 20N comprises a lens connector 22N is formed at the mid-portion of the lens frame 40M at a position between the two lenses 10M. The lens connector 22N has a hook shape that an engaging slot 221N is indently and upwardly extended from the bottom edge of the lens connector 22N. In other words, the lens connector 22N has an inverted U-shaped configuration.

The second connectors 30F are provided at the bridge 3M of the frame to detachably couple with the lens connectors 22N respectively so as to retain the lens frame 40M behind the frame.

The second connector 30F comprises a connecting member 31F and a clipping member 32F, wherein each of the connecting members 31F is coupled with the bridge 3M. The connecting member 31F has one end coupling with the rear side of the bridge 3M and an opposed end pivotally coupling with the clipping member 32F. As shown in FIG. 17, the lens connector 32N is slidably engaged with the second connector 30F at a position that the connecting member 31F is slidably engaged with the engaging slot 221N such that the lens connector 22N is positioned between the rear side of the bridge 3M and the clipping member 32F.

The clipping member 32F is pivotally engaged with connecting member 31F, wherein the clipping member 32F comprises a pressuring clipper 321F and a trigger 322F. The pressuring clipper 321F is pivotally coupled with the corresponding end of the connecting member 31F while the trigger 322F is extended from the pressuring clipper 321F. When the trigger 322F is actuated to pivotally move the pressuring clipper 321F to bias against the rear side of the lens connector 22N, the lens connector 22N is securely clipped between the clipping member 32F and the bridge 3M. Therefore, the lens frame 40M can be quickly and firmly mounted behind the frame by the clipping force. Likewise, the clipping member 32F is pivotally moved among the releasing position, the locked position, and the anti-returning position.

Figure 18:
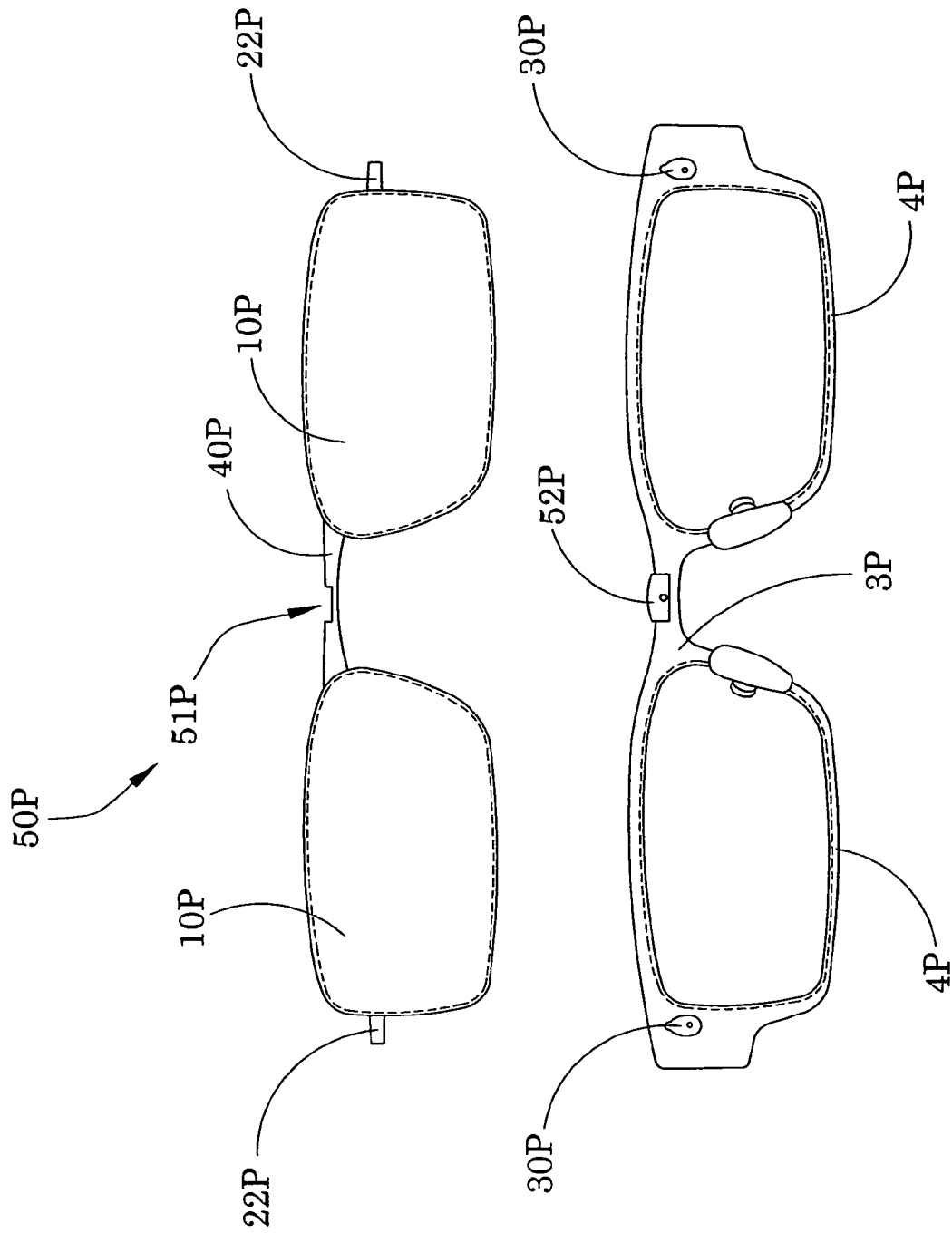
FIG. 18 is a front view of the spectacles according to a seventh embodiment of the present invention.

As shown in FIG. 18, the spectacles of a seventh embodiment illustrates an alternative mode of the above embodiment, wherein the spectacles comprises a lens frame 40P coupling with the two lenses 10P to retain the distance between the lenses 10P. As it is mentioned above the frame comprises two lens rims 4P, a bridge 3P extended between two inner sides of the lens rims 4P, and two temple units 2P extended from two outer sides of the lens rims 4P respectively. It is worth to mention that the shape of the lens frame 40P matches with the shape of the frame such that when the lens frame 40P is mounted to the frame, the lenses 10P will automatically aligned with the lens rims 4P respectively. The size of the lens frame 40P is smaller than the size of the frame such that when the lens frame 40P is mounted behind the frame, i.e. the rear side of the frame, the lens frame 40P is hidden behind the frame.

The first connector 20P comprises two lens connectors 22P sidewardly extended from two outer sides of the lens 10P respectively.

The second connectors 30P are provided at two outer sides of the lens rims 4P at the rear side thereof to detachably couple with the lens connectors 22P respectively so as to retain the lens frame 40P behind the frame.

Figure 19:
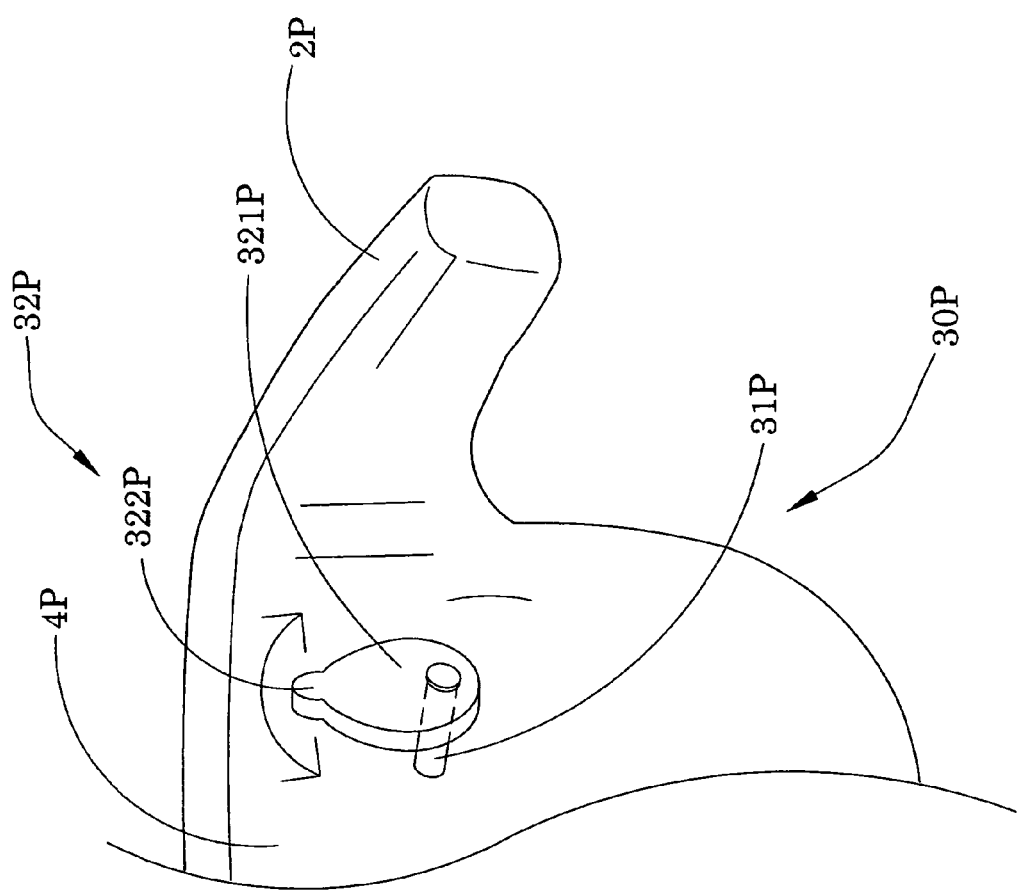
FIG. 19 is a perspective view of the second connector of the spectacles according to the above seventh embodiment of the present invention.
Figure 20A:
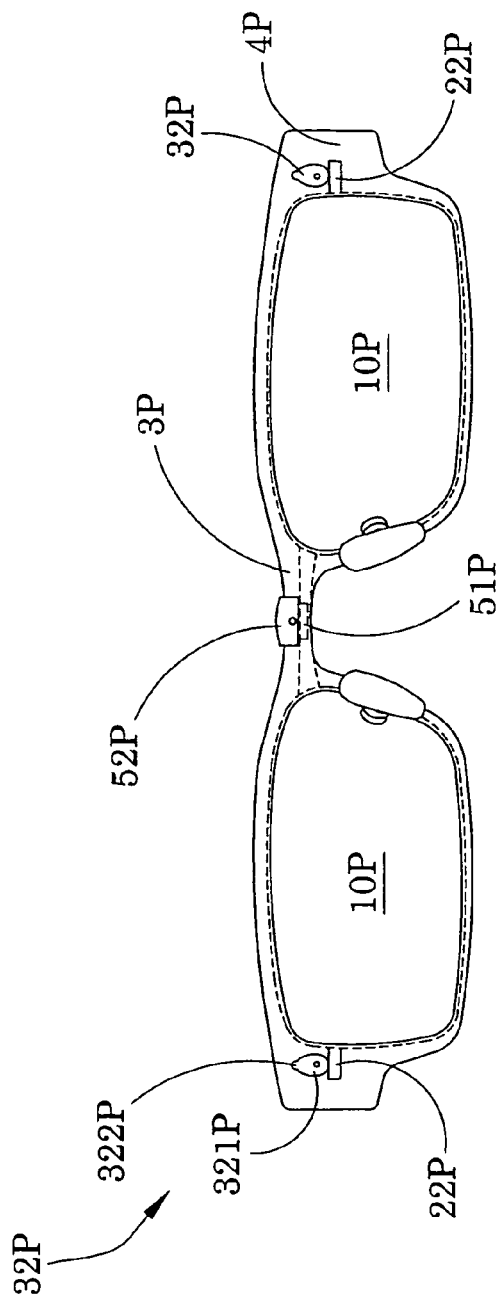
FIG. 20A is a front view of the spectacles according to the seventh embodiment of the present invention, illustrating the second connector at the releasing position.
Figure 20B:
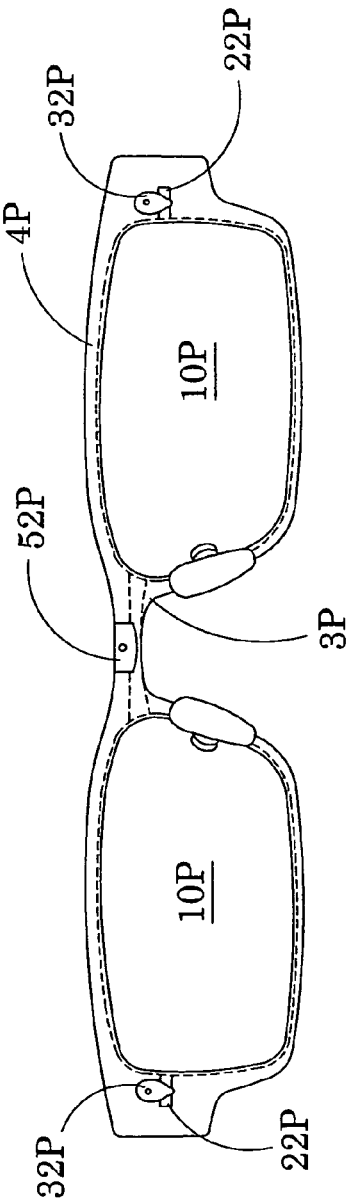
FIG. 20B is a front view of the spectacles according to the seventh embodiment of the present invention, illustrating the second connector at the locked position.

As shown in FIG. 19, each of the second connectors 30P comprises a connecting member 31P and a clipping member 32P, wherein each of the connecting members 31P is coupled with the respective lens rim 4P. The connecting member 31P has one end coupling with the rear side of the respective lens rim 4P and an opposed end rearwardly extended that the clipping member 32P is rotatably coupling thereto. According to the preferred embodiment, the clipping member 32P is eccentrically coupled with the connecting member 31P to rotatably move between a releasing position and a locked position. At the releasing position, as shown in FIG. 20A, the clipping member 32P is moved away from the respective lens connector 22P such that the lens frame 40P is free to detach from the frame. At the locked position, as shown in FIG. 20B, the clipping member 32P is moved to bias against the rear side of the lens connector 22P such that the lens frame 40P is locked behind the frame.

The clipping member 32P is rotatably engaged with connecting member 31P, wherein the clipping member 32F comprises a pressuring clipper 321P and a trigger 322P. The pressuring clipper 321P, preferably having an oval shape, is rotatably coupled with the corresponding end of the connecting member 31P while the trigger 322P is extended from the pressuring clipper 321P. When the trigger 322P is actuated to rotatably move the pressuring clipper 321P to bias against the rear side of the lens connector 22P, the lens connector 22P is securely clipped between the clipping member 32P and the lens rim 4P. Therefore, the lens frame 40P can be quickly and firmly mounted behind the frame.

The spectacles further comprise a bridge engagement 50P for holding the lens frame 40P behind the frame. The bridge engagement 50P has an engaging slot 51P integrally formed at the lens frame 40P at a position between the two lenses 10P, and comprises a bridge clip 52P provided at the bridge 3P of the frame to detachably engage with the engaging slot 51P to hold the lens frame 40P behind the frame.

It is worth to mention that when the bridge clip 52P is detachably engaged with the engaging slot 51P to hold the lens frame 40P in position, the user is able to rotatably move the clipping members 32P to bias the lens connectors 22P respectively. Likewise, when the clipping members 32P are moved away from the lens connectors 22P respectively, the lens frame 40P is still held behind the frame. Therefore, the user is able to detach the bridge clip 52P from the engaging slot 51P to detach the lens frame 40P from the frame.

Figure 21:
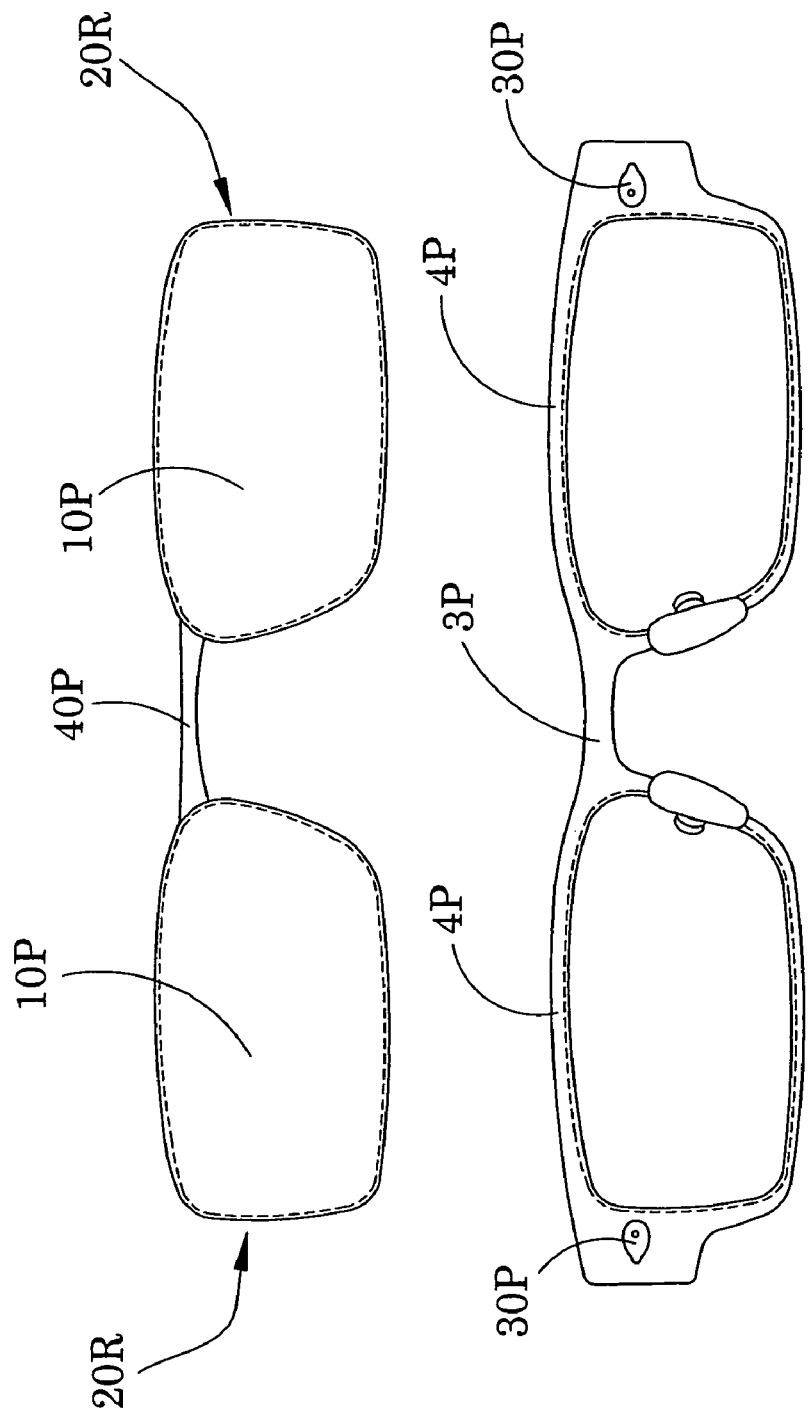
FIG. 21 is a front view of the spectacles according to an eighth embodiment of the present invention.

As shown in FIG. 21, the spectacles of an eighth embodiment illustrates an alternative mode of the above embodiment, wherein the spectacles comprises a lens frame 40P coupling with the two lenses 10P to retain the distance between the lenses 10P. As it is mentioned above the frame comprises two lens rims 4P, a bridge 3P extended between two inner sides of the lens rims 4P, and two temple units 2P extended from two outer sides of the lens rims 4P respectively. It is worth to mention that the shape of the lens frame 40P matches with the shape of the frame such that when the lens frame 40P is mounted to the frame, the lenses 10P will automatically aligned with the lens rims 4P respectively. The size of the lens frame 40P is smaller than the size of the frame such that when the lens frame 40P is mounted behind the frame, i.e. the rear side of the frame, the lens frame 40P is hidden behind the frame.

The first connector 20R is formed as each of the two outer sides of the lenses 10P respectively.

The second connectors 30P are provided at two outer sides of the lens rims 4P at the rear side thereof to detachably couple with t the two outer sides of the lenses 10P respectively so as to retain the lens frame 40P behind the frame.

Figure 22A:
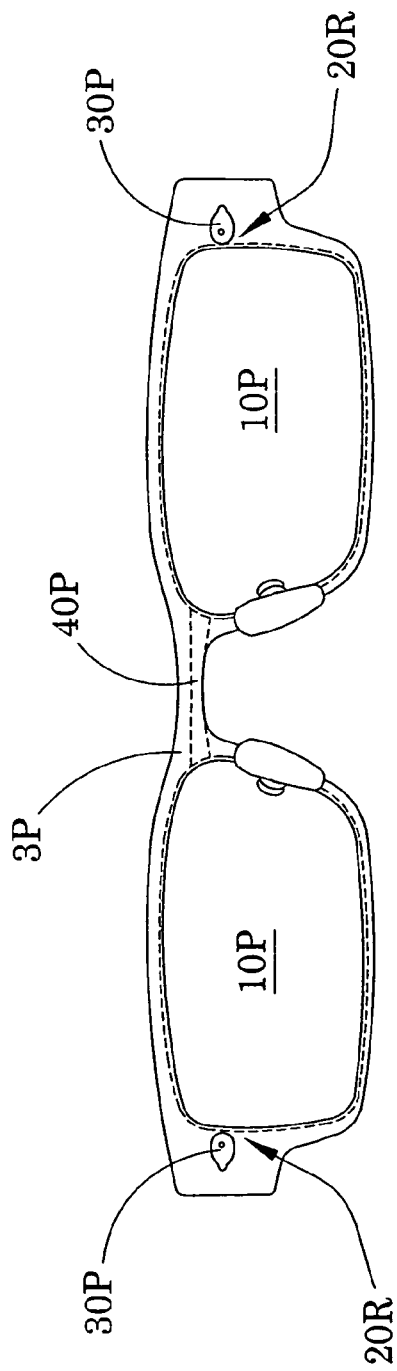
FIG. 22A is a front view of the spectacles according to the eighth embodiment of the present invention, illustrating the second connector at the releasing position.
Figure 22B:
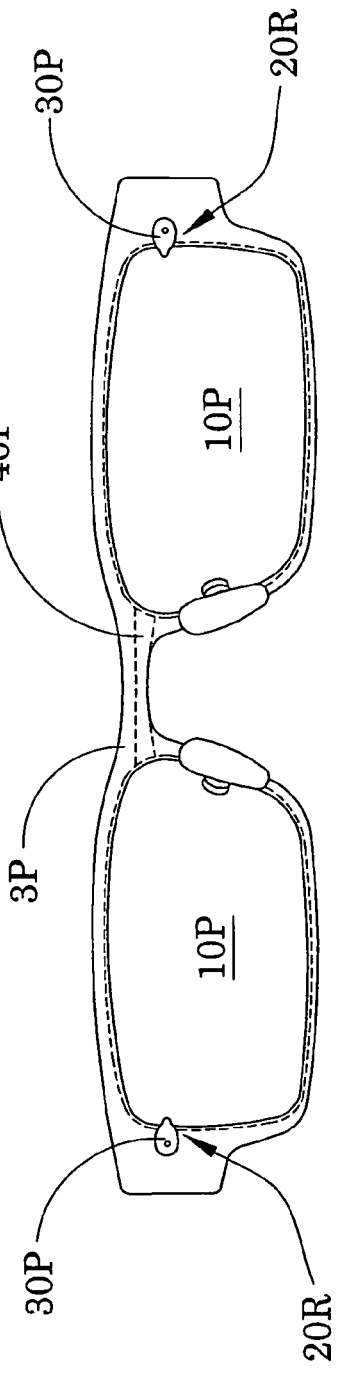
FIG. 22B is a front view of the spectacles according to the eighth embodiment of the present invention, illustrating the second connector at the locked position.

As shown in FIG. 21, each of the second connectors 30P comprises a connecting member 31P and a clipping member 32P, wherein each of the connecting members 31P is coupled with the respective lens rim 4P. The connecting member 31P has one end coupling with the rear side of the respective lens rim 4P and an opposed end rearwardly extended that the clipping member 32P is rotatably coupling thereto. According to the preferred embodiment, the clipping member 32P is eccentrically coupled with the connecting member 31P to rotatably move between a releasing position and a locked position. At the releasing position, as shown in FIG. 22A, the clipping member 32P is moved away from the respective outer side of the lens 10P such that the lens frame 40P is free to detach from the frame. At the locked position, as shown in FIG. 22B, the clipping member 32P is moved to bias against the rear side of the outer side of the lens 10P, i.e. the first connector 20R, such that the lens frame 40P is locked behind the frame.

It is worth mentioning that the clipping member 32P is directly biased against the outer side of the respective lens 10P at the peripheral edge thereof to lock the lens frame 40P behind the frame. In other words, the two lens connectors 22P shown in the eleventh embodiment are the outer sides of the peripheral edges of the lenses 10P respectively in this twelfth embodiment.

According to the above embodiments, the temple units 2 and the bridge 3 can be precisely and rapidly coupled with the lenses 10 via the above mentioned assembling structures. In addition, the lens 10 can be selectively cut in different styles according to the user's preference to incorporate with the temple units 2 and the bridge 3 via the above mentioned connection mechanisms. Therefore, there is no limitation of the lens, such as the shape, the size, or the thickness for incorporating with the connection mechanism.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A pair of spectacles, comprising:

two lenses, each of said lenses has a front side, a rear side, and a peripheral edge;

a frame which comprises two temple units and a bridge; and a connection mechanism, which comprises:

one or more first connectors provided at said lenses at a predetermined location; and one or more second connectors provided at a predetermined location of at least one of said temple units and said bridge, wherein said second connector is coupled with said first connector to retain said lenses at said frame, wherein said second connector is moved among a releasing position that said lens is adapted to detach from said frame, a locked position that said lens is locked up with said frame, and an anti-returning position that said lens is securely retained at said frame for preventing said second connector from being returned back to said releasing position;

wherein said first connector comprises a coupling slot provided at one of said inner and outer sides of said lens that said coupling slot is indently formed at said peripheral edge of said respective lens to detachably engage with said second connector so as to selectively couple said frame to said lens.

2. The spectacles, as recited in claim 1, wherein said second connector comprises a connecting member provided at said frame, and a clipping member pivotally coupled with said connecting member to pivotally move among said releasing position that said lens is adapted to detach from said frame, said locked position that said lens is locked up with said frame, and said anti-returning position that said lens is securely retained at said frame for preventing said clipping member from being returned back to said releasing position.

3. The spectacles, as recited in claim 2, wherein said clipping member has a sliding surface and defines a first surface point when said clipping member is pivotally moved at said releasing position, a second surface point when said clipping member is pivotally moved at said locked position, and a third surface point when said is pivotally moved at said anti-returning position, wherein a distance between said first surface point and a pivot point of said clipping member is smaller than a distance between said second surface point and said pivot point, which is smaller than a distance between said third surface point and said pivot point.

4. The spectacles, as recited in claim 3, wherein said pivot point is eccentric to a center of said clipping member.

5. The spectacles, as recited in claim 4, wherein said sliding surface of said clipping member has a curved surface portion to slide between said releasing position and said locked position, a flat surface portion extended from said curved surface portion and arranged when said clipping member is moved at said anti-returning position, said flat surface portion of said clipping member is biased against said lens.

6. The spectacles, as recited in claim 5, wherein said clipping member comprises a pressuring clipper pivotally coupled with said connecting member for engaging with said respective lens at said coupling slot, and a trigger which is extended from said pressuring clipper and is actuated to pivotally move said pressuring clipper among said releasing position, said locked position, and said anti-returning position.

7. A pair of spectacles, comprising:
    two lenses, each of said lenses has a front side, a rear side, and a peripheral edge;
    a frame which comprises two temple units and a bridge; and
    a connection mechanism, which comprises:
    one or more first connectors provided at said lenses at a predetermined location; and
    one or more second connectors provided at a predetermined location of at least one of said temple units and said bridge, wherein said second connector is coupled with said first connector to retain said lenses at said frame, wherein said second connector is moved among a releasing position that said lens is adapted to detach from said frame, a locked position that said lens is locked up with said frame, and an anti-returning position that said lens is securely retained at said frame for preventing said second connector from being returned back to said releasing position;
    wherein said second connector comprises a connecting member provided at said frame, and a clipping member pivotally coupled with said connecting member to pivotally move among said releasing position that said lens is adapted to detach from said frame, said locked position that said lens is locked up with said frame, and said anti-returning position that said lens is securely retained at said frame for preventing said clipping member from being returned back to said releasing position;
    wherein said first connector comprises two lens rims encirclingly holding around said peripheral edges of said lenses respectively, wherein each of said lens rims has a side opening provided at an outer side to form a C-shaped structure and upper and lower engaging members extended from two ends of said lens rim at said side opening, wherein when said upper and lower engaging members are biased against each other via said second connector to close said side opening, said respective lens is locked and retained within said lens rim;
    wherein said connecting member is provided at said upper engaging member to couple with said lower engaging member, wherein said clipping member pivotally coupled with said connecting member to pivotally move among said releasing position that said lens is adapted to detach from said respective lens rim, said locked position that said lens is locked up with said lens rim, and said anti-returning position that said lens is securely retained at said lens rim for preventing said clipping member from being returned back to said releasing position;
    wherein said clipping member has a sliding surface and defines a first surface point when said clipping member is pivotally moved at said releasing position, a second surface point when said clipping member is pivotally moved at said locked position, and a third surface point when said is pivotally moved at said anti-returning position, wherein a distance between said first surface point and a pivot point of said clipping member is smaller than a distance between said second surface point and said pivot point, which is smaller than a distance between said third surface point and said pivot point;
    wherein said pivot point is eccentric to a center of said clipping member;
    wherein said sliding surface of said clipping member has a curved surface portion to slide between said releasing position and said locked position, a flat surface portion extended from said curved surface portion and arranged when said clipping member is moved at said anti-returning position, said flat surface portion of said clipping member is biased against said lens.

8. The spectacles, as recited in claim 7, wherein said clipping member comprises a pressuring clipper pivotally coupled with said connecting member for engaging with said connecting member on said on said upper engaging member, and a trigger which is extended from said pressuring clipper and is actuated to pivotally move said pressuring clipper among said releasing position, said locked position, and said anti-returning position.

9. The spectacles, as recited in claim 8, wherein each of said lens rims further has a lens groove indently provided at an inner surface of said lens rim to engage with said peripheral edge of said respective lens, such that when said side opening is closed, said respective lens is securely retained within said lens rim.

10. A method of assembling spectacles, comprising the steps of:
    (a) configuring one or more first connectors at each lens of said spectacles, wherein each of said lenses has a front side, a rear side, and a peripheral edge;
    (b) configuring one or more second connectors at predetermined location of a frame of said spectacles, wherein said frame comprises two temple units and a bridge; and (c) detachably coupling said second connector with said first connector to retain said lenses at said frame in position by the steps of:
(c.1) moving said second connector at a releasing position that said lens is adapted to detach from said frame;
(c.2) moving said second connector at a locked position that said lens is locked up with said frame; and
(c.3) moving said second connector at an anti-returning position that said lens is securely retained at said frame for preventing said second connector from being returned back to said releasing position;
wherein the step (a) further comprises a step of configuring said first connector as a coupling slot indently formed at said peripheral edge of said respective lens to detachably engage with said second connector.

11. The method, as recited in claim 10, wherein the step (b) further comprises a step of pivotally moving a clipping member of said second connector among said releasing position, said locked position, and said anti-returning position, wherein a connecting member of said second connector is provided at said frame and is pivotally coupled with said clipping member, such that said connecting member is moved at said releasing position that said lens is adapted to detach from said frame, is moved at said locked position that said lens is locked up with said frame, and is moved at said anti-returning position that said lens is securely retained at said frame while preventing said clipping member from being returned back to said releasing position.

12. The method as recited in claim 10 wherein, in the step (c), said clipping member has a sliding surface and defines a first surface point when said clipping member is pivotally moved at said releasing position, a second surface point when said clipping member is pivotally moved at said locked position, and a third surface point when said is pivotally moved at said anti-returning position, wherein a distance between said first surface point and a pivot point of said clipping member is smaller than a distance between said second surface point and said pivot point, which is smaller than a distance between said third surface point and said pivot point.

13. The method, as recited in claim 12, wherein said pivot point is eccentric to a center of said clipping member.

14. The method, as recited in claim 13, wherein said sliding surface of said clipping member has a curved surface portion to slide between said releasing position and said locked position, a flat surface portion extended from said curved surface portion and arranged when said clipping member is moved at said anti-returning position, said flat surface portion of said clipping member is biased against said lens.

15. The method, as recited in claim 14, wherein the step (c) further comprises the steps of pivotally coupling a pressuring clipper of said clipping member with said connecting member for engaging with said respective lens at said coupling slot; and actuating a trigger which is extended from said pressuring clipper to pivotally move said pressuring clipper among said releasing position, said locked position, and said anti-returning position.

16. A method of assembling spectacles, comprising the steps of:
(a) configuring one or more first connectors at each lens of said spectacles, wherein each of said lenses has a front side, a rear side, and a peripheral edge;
(b) configuring one or more second connectors at predetermined location of a frame of said spectacles, wherein said frame comprises two temple units and a bridge; and
(c) detachably coupling said second connector with said first connector to retain said lenses at said frame in position by the steps of:

(c.1) moving said second connector at a releasing position that said lens is adapted to detach from said frame,
(c.2) moving said second connector at a locked position that said lens is locked up with said frame: and
(c.3) moving said second connector at an anti-returning position that said lens is securely retained at said frame for preventing said second connector from being returned back to said releasing position;
wherein the step (b) further comprises a step of pivotally moving a clipping member of said second connector among said releasing position, said locked position, and said anti-returning position, wherein a connecting member of said second connector is provided at said frame and is pivotally coupled with said clipping member, such that said connecting member is moved at said releasing position that said lens is adapted to detach from said frame, is moved at said locked position that said lens is locked up with said frame, and is moved at said anti-returning position that said lens is securely retained at said frame while preventing said clipping member from being returned back to said releasing position;
wherein the step (a) further comprises the steps of: (a.1) encirclingly holding said peripheral edges of said lenses around two lens rims respectively, wherein each of said lens rim has a side opening provided at an outer side to form a C-shaped structure; (a.2) providing upper and lower engaging member at two ends of each of said lens rims at said side opening thereof; and (a.3) selectively closing said side opening when said upper and lower engaging members are biased against each other via said second connector, such that said respective lens is locked and retained within said lens rim;
wherein said connecting member is provided at said upper engaging member to couple with said lower engaging member, wherein said clipping member pivotally coupled with said connecting member to pivotally move among said releasing position that said lens is adapted to detach from said respective lens rim, said locked position that said lens is locked up with said lens rim, and said anti-returning position that said lens is securely retained at said lens rim for preventing said clipping member from being returned back to said releasing position;
wherein, in the step (c), said clipping member has a sliding surface and defines a first surface point when said clipping member is pivotally moved at said releasing position, a second surface point when said clipping member is pivotally moved at said locked position, and a third surface point when said is pivotally moved at said anti-returning position, wherein a distance between said first surface point and a pivot point of said clipping member is smaller than a distance between said second surface point and said pivot point, which is smaller than a distance between said third surface point and said pivot point;
wherein said pivot point is eccentric to a center of said clipping member;
wherein said sliding surface of said clipping member has a curved surface portion to slide between said releasing position and said locked position, a flat surface portion extended from said curved surface portion and arranged when said clipping member is moved at said anti-returning position, said flat surface portion of said clipping member is biased against said lens.

17. The method, as recited in claim 16, wherein the step (c) further comprises the steps of pivotally coupling a pressuring clipper of said clipping member with said connecting member for engaging with said respective lens at said coupling slot; and actuating a trigger which is extended from said pressuring clipper to pivotally move said pressuring clipper among said releasing position, said locked position, and said anti-returning position.

18. The method, as recited in claim 17, wherein the step (a.1) further comprises a step of configuring a lens groove indently provided at an inner surface of each of said lens rims to engage with said peripheral edge of said respective lens, such that when said side opening is closed, said respective lens is securely retained within said lens rim.

* * * * *